United States Patent [19]
Gilovich

[11] Patent Number: 6,057,990
[45] Date of Patent: May 2, 2000

[54] MULTIPLE ACTUATOR ASSEMBLIES FOR DATA STORAGE DEVICES

[76] Inventor: Paul A. Gilovich, 4545 Laguna Pl., Suite 180, Boulder, Colo. 80303

[21] Appl. No.: 09/084,509

[22] Filed: May 26, 1998

Related U.S. Application Data

[60] Provisional application No. 60/047,649, May 27, 1997.

[51] Int. Cl.[7] ..................................................... G11B 5/55
[52] U.S. Cl. ............................................................ 360/106
[58] Field of Search ..................................... 360/104–106

[56] References Cited

U.S. PATENT DOCUMENTS

| | | | |
|---|---|---|---|
| 5,189,577 | 2/1993 | Nishida et al. | 360/106 |
| 5,218,496 | 6/1993 | Kaczeus | 360/106 |
| 5,223,993 | 6/1993 | Squires et al. | 360/77.08 |
| 5,293,282 | 3/1994 | Squires et al. | 360/77.08 |
| 5,343,345 | 8/1994 | Gilovich | 360/104 |
| 5,343,347 | 8/1994 | Gilovich | 360/104 |
| 5,477,401 | 12/1995 | Squires et al. | 360/75 |
| 5,610,808 | 3/1997 | Squires et al. | 364/131 |

*Primary Examiner*—Allen T. Cao
*Attorney, Agent, or Firm*—Emery L. Tracy

[57] ABSTRACT

A data storage device having a first data storage disk and a first actuator arm assembly having at least one arm is provided. Each of the arms have a distal end carrying a read/write transducer head for reading information from and writing information to only the first data storage disk. The data storage device comprises a second data storage disk and a second actuator arm assembly having at least one arm. Each arm has a distal end carrying a read/write transducer head with the read/write transducer head reading information from and writing information to only the second data storage disk.

20 Claims, 26 Drawing Sheets

MULTIPLE ACTUATOR ASSEMBLIES FOR DATA STORAGE DEVICES

The present application is a continuation-in-part of pending provisional patent application Ser. No. 60/047,649, filed on May 27, 1997.

BACKGROUND OF THE INVENTION

1. Field of the Invention

This invention relates generally to a rotating disk type data storage devices and, more particularly, it relates to a data storage device having multiple actuator assemblies.

2. Description of the Prior Art

Today, disk-type memory devices are typically manufactured having a single actuator assembly mounted within the industry standard disk drive enclosures. The actuator assembly typically has a read/write mounted at a distal end for reading optical, magneto optical, or magnetic data from a rotating disk mounted about a disk hub or spindle. The read/write is oriented such that if the disk is rotating in a generally counterclockwise direction, the actuator arm and the read/write extend to an area right (if viewed from the base of the actuator arm) of the disk hub. Likewise, if the disk is rotating in a generally clockwise direction, the actuator arm and the read/write extend to an area left (if viewed from the base of the actuator arm) of the disk hub. In the industry, Applicant believes that no manufacturer constructs a transducer head which would accommodate a different orientation (i.e., disk rotating clockwise, read/write right of disk spindle, or disk rotating counterclockwise, read/write left of disk spindle) than the orientations described above due to costs and low demand for such read/writes.

Magnetic memory devices having multiple actuator assemblies are present in the art. For example, the Glaser et al, U.S. Pat. No. 5,081,552, describes a rigid data magnetic disk drive head disk assembly having a pair of actuator assemblies. Unfortunately, as is the problem with other attempts at providing a multiple actuator disk drive, the disk drive of the Glaser et al patent requires at least two different and distinct transducer heads. FIG. 1 illustrates the Glaser et al patent with the positioning of the actuator assemblies requiring utilizing two different types of transducer heads. The special transducer heads as indicated in FIG. 1 are not, as mentioned above manufactured today due to high costs and low demand.

Other prior art, the Gilovich, U.S. Pat. No. 5,343,345 and the Gilovich, U.S. Pat. No. 5,343,347, issued to the same Applicant of the present application, also describe a disk drive transducer head disk assembly having multiple actuators which requires at least two different and distinct transducer heads unless, in the case of two actuators, the actuators are positioned in diagonal corners. As indicated above, the special transducer heads required are not manufactured today and would be cost prohibitive for use in typical market required disk drives.

SUMMARY

The present invention is a data storage device having a first data storage disk and a first actuator arm assembly having at least one arm. Each of the arms have a distal end carrying a read/write transducer head for reading information from and writing information to only the first data storage disk. The data storage device comprises a second data storage disk and a second actuator arm assembly having at least one arm. Each arm has a distal end carrying a read/write transducer head with the read/write transducer head reading information from and writing information to only the second data storage disk.

In an embodiment of the present invention, the data storage device comprises a third data storage disk and a third actuator arm assembly having at least one arm. Preferably, each arm has a distal end carrying a read/write transducer head with the read/write transducer head reading information from and writing information to only the third data storage disk.

In another embodiment of the present invention, the data storage device comprises a fourth data storage disk and a fourth actuator arm assembly having at least one arm. Preferably, each arm has a distal end carrying a read/write transducer head with the read/write transducer head reading information from and writing information to only the fourth data storage disk.

In still another embodiment of the present invention, the data storage device comprises a fifth data storage disk and a fifth actuator arm assembly having at least one arm. Preferably, each arm has a distal end carrying a read/write transducer head with the read/write transducer head reading information from and writing information to only the fifth data storage disk.

In yet another embodiment of the present invention, the data storage device comprises a sixth data storage disk and a sixth actuator arm assembly having at least one arm. Preferably, each arm has a distal end carrying a read/write transducer head, the read/write transducer head reading information from and writing information to only the sixth data storage disk.

In still yet another embodiment of the present invention, the data storage device comprises 'n' number of data storage disks with their respective actuator arm assemblies each having at least one arm each. Preferably, each arm has a distal end carrying a read/write transducer head with the read/write transducer head of each actuator arm assembly reading information from and writing information to only a respective one of the 'n' number of data storage disks. The actual number 'n' is not limited to any particular number and can be twelve or more.

In another embodiment of the present invention, each read/write transducer head is substantially identical to each other read/write transducer head to follow the disk in the same direction. Preferably, the actuator arm assemblies each have an actuator pivot axis with both of the actuator pivot axes positioned on the same side of a plane extending through the axis of rotation of the disks.

In still another embodiment of the present invention, the data storage device comprises a housing surrounding the disks wherein the disks are positioned away from the center of the housing.

DETAILED DESCRIPTION OF THE PREFERRED EMBODIMENTS

Figure 1:
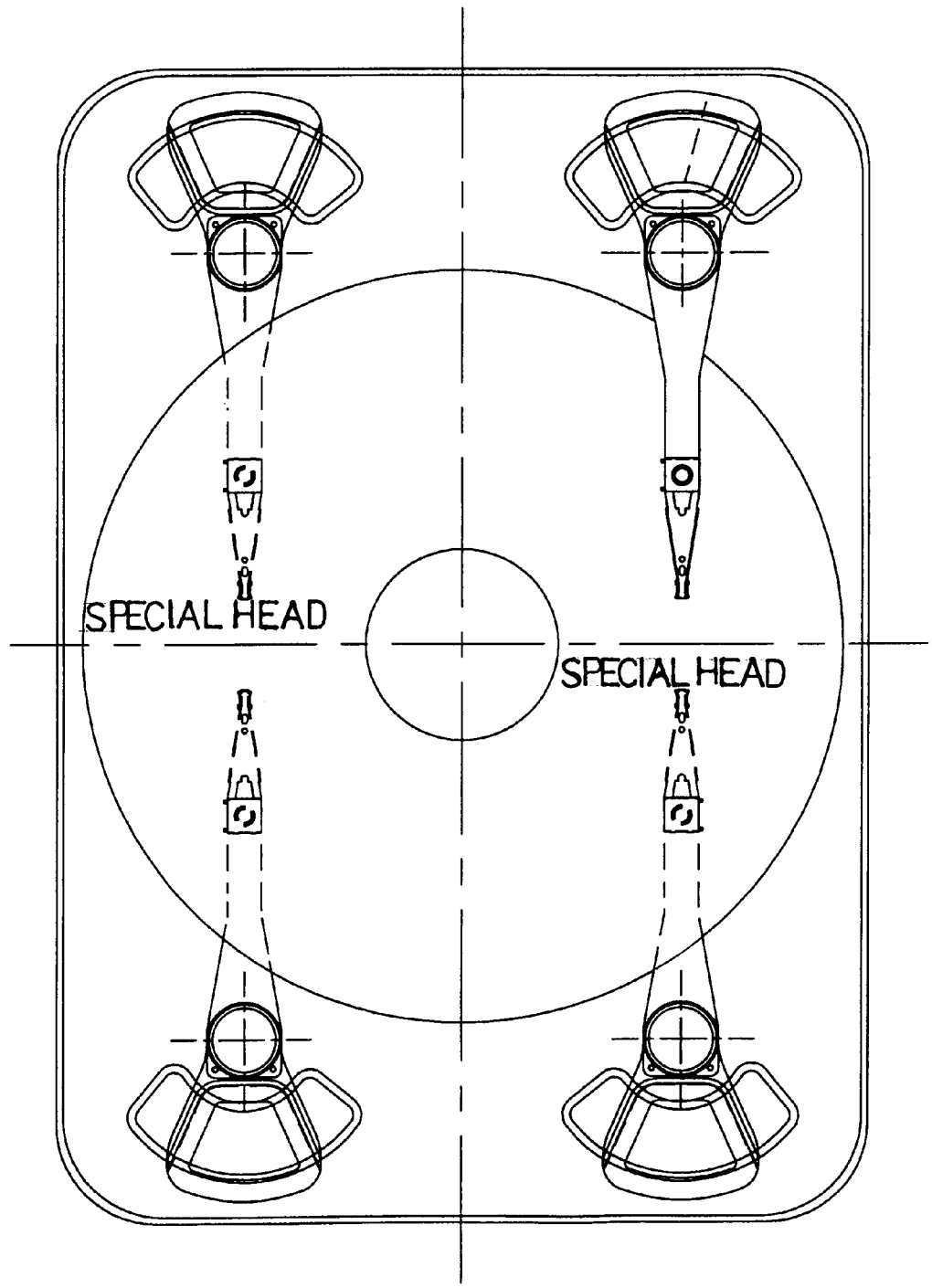
FIG. 1 top plan view illustrating a disk drive assembly of the prior art with the positioning of the actuator assemblies requiring utilizing two different types of transducer heads.

The Applicant has invented a new and improved multiple actuator assembly, indicated generally at 10, for use in rotatable storage devices 12, especially, but not limited to, magnetic memory devices such as hard disk drives. Accordingly, the Applicant hereby herein incorporates pending U.S. Patent application, Ser. No. 08/686,804, owned and invented by the Applicant of the present invention, by reference. One of the major differences between the referenced incorporated patent application and the present application is the orientation of the actuator assemblies 10 within the rotatable storage device 12 as will be discussed in further detail below.

It should be noted that while the present invention has been described herein and will be described heretofore as related to a hard disk drive apparatus 14 and the like it is within the scope of the present invention to utilize the present invention on any data storage device 12. The person skilled in the art will understand that the present invention is not limited to hard disk drive apparatus 14 and the like.

The high performance, high capacity hard disk drive (HDD) apparatus 14 of the present invention includes a head disk assembly (HDA) 16 which comprises a plurality of varying-sized, industry standard form factor data storage disks 18 mounted on a hub of a disk drive motor. Preferably, at least two read/write transducer head positioning actuator assemblies 20, each utilizing at least one voice coil motor (VCM), and a minimum of two VCM's are positioned adjacent the disks, as illustrated in FIGS. 2–19, within certain areas of the HDD apparatus 14 housing.

The number of hard disks 18 contained in the head disk assembly 16 in the apparatus 10 of the present invention can be varied. The maximum, however, is dictated by the overall height of the apparatus 10. Tooling changes for different capacity assemblies are therefore minimized in the present invention because the primary difference between drives is the height of this peripheral housing. Thus, a half height 5.2 inch form factor drive apparatus in accordance with the present invention would have a peripheral housing having a lesser 'z' height. The number of disks would also depend on the thickness of each of the disks and the space between the disks required for the actuator arms.

In the invention of the present application, each of the actuator assemblies are situated within the hard disk drive as illustrated in the FIGS. 2–19. By positioning the actuator assemblies as illustrated to follow the disks in the same direction, the transducer heads mounted on the free distal ends of the actuator arms can all be identical and interchangeable with each other transducer head in the disk drive. The disk drive of the present application does not require special manufactured transducer heads (or read/writes) in order for the disk drive to properly operate.

Figure 2:
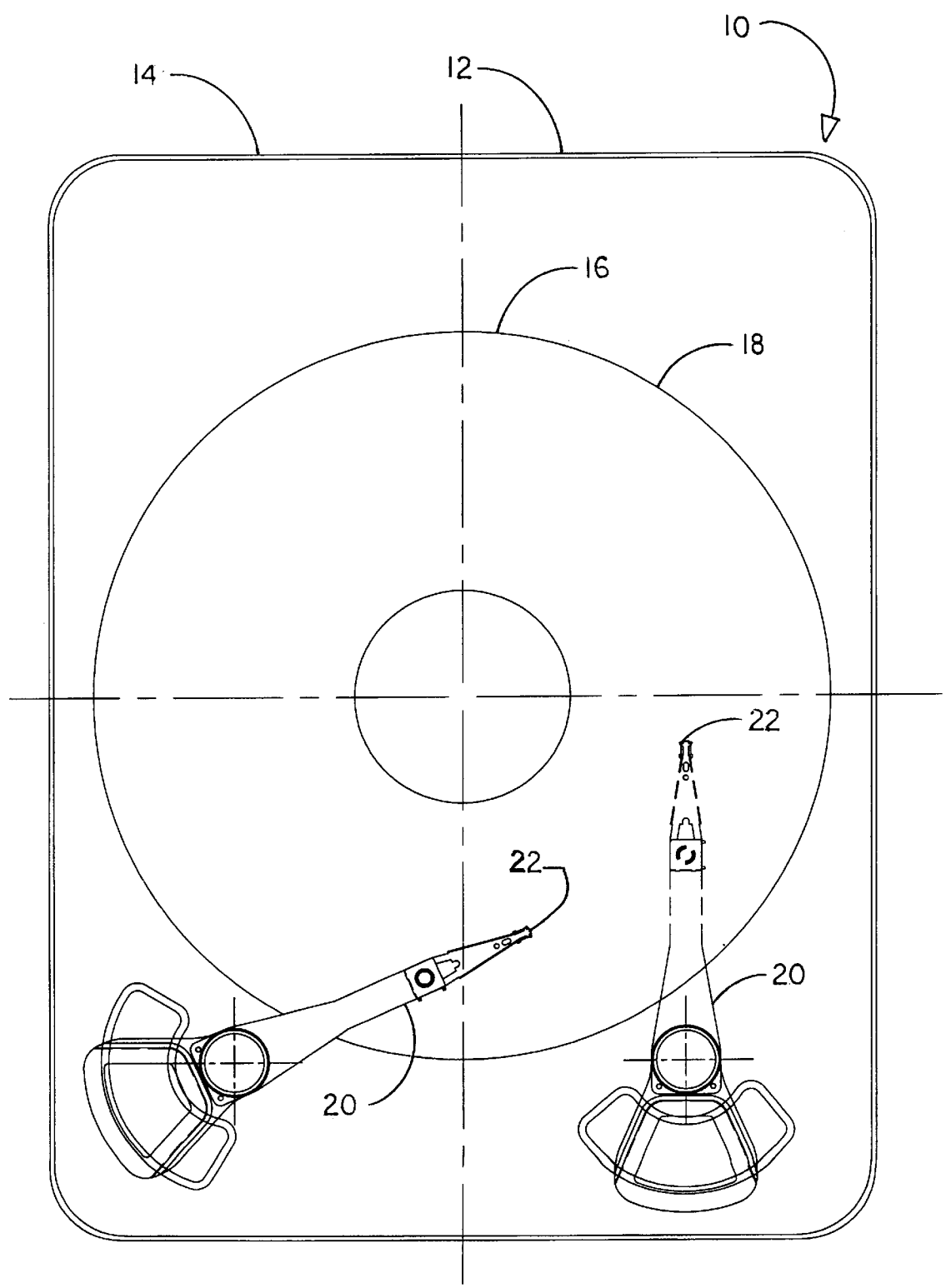
FIG. 2 is a top plan view illustrating the positioning of two actuator assemblies in a 5.25 inch disk drive form factor as constructed in accordance with the present invention.
Figure 3:
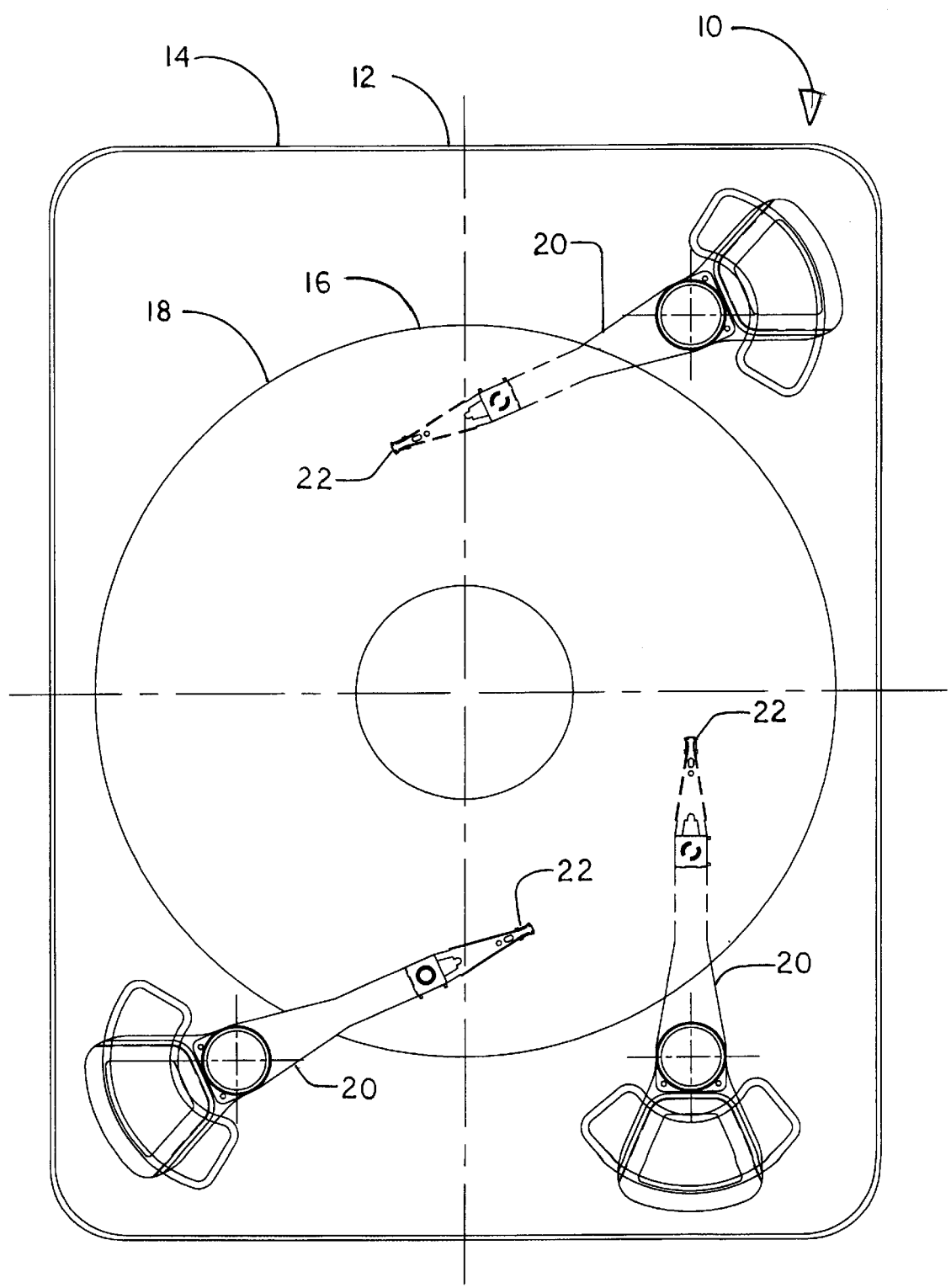
FIG. 3 is a top plan view illustrating the positioning of three actuator assemblies in a 5.25 inch disk drive form factor as constructed in accordance with the present invention.
Figure 4:
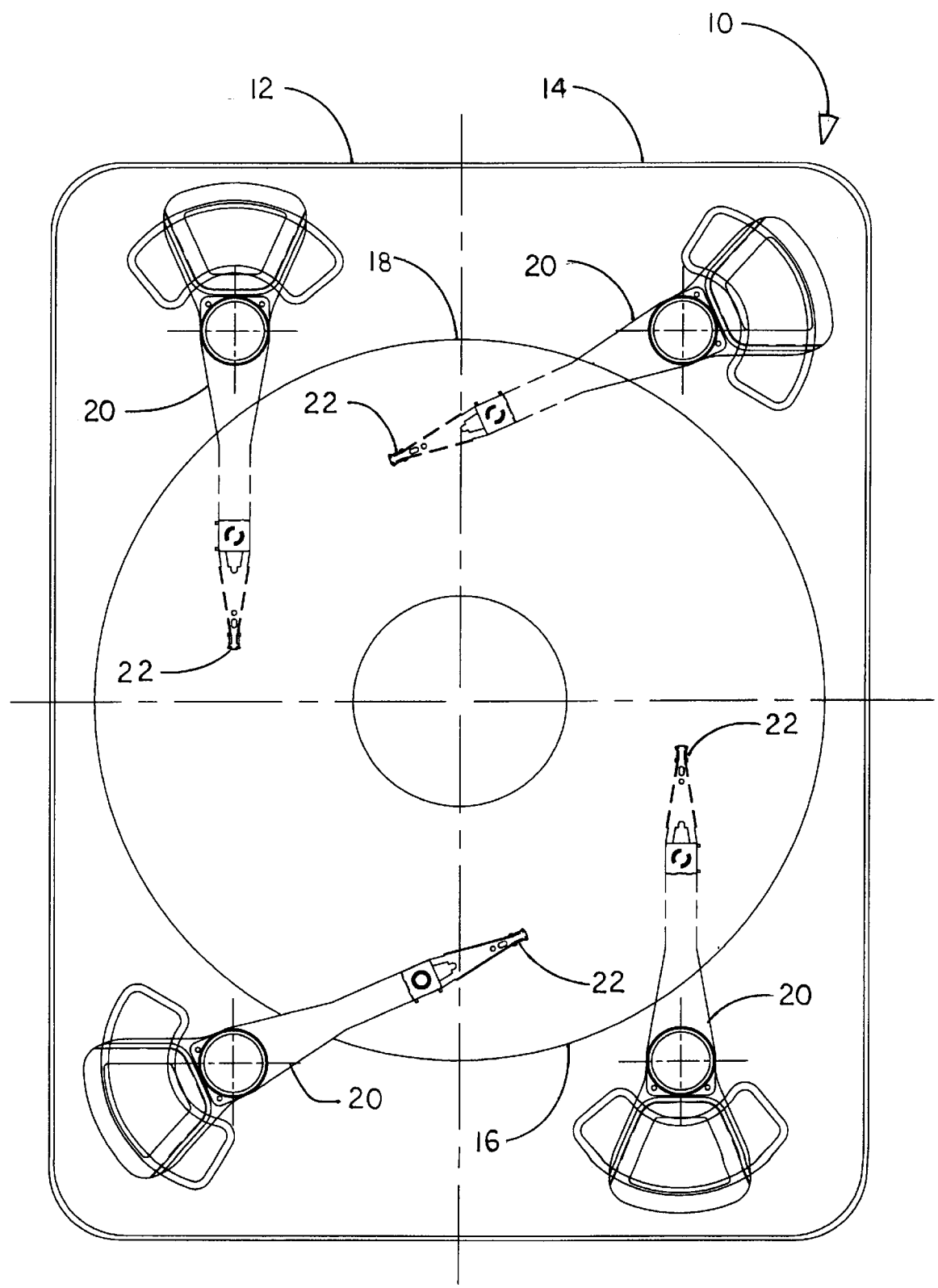
FIG. 4 is a top plan view illustrating the positioning of four actuator assemblies in a 5.25 inch disk drive form factor as constructed in accordance with the present invention.

FIGS. 2, 3, and 4 illustrate the multiple actuator assemblies 10 of the present invention within a 5.2 inch form factor utilizing 5.2 inch disks. FIG. 2 illustrates the positioning of two actor assemblies 20. FIG. 3 illustrates the positioning of three actuator assemblies 20. FIG. 4 illustrates the positioning of four actuator assemblies 20. Assuring a general counterclockwise rotation of the disks 18, each of the actuator assemblies 20 is positioned such that the transducer head 22 is in the area to the right (as viewed from the base of each of the respective actuator arms) of the disk hub.

Figure 5:
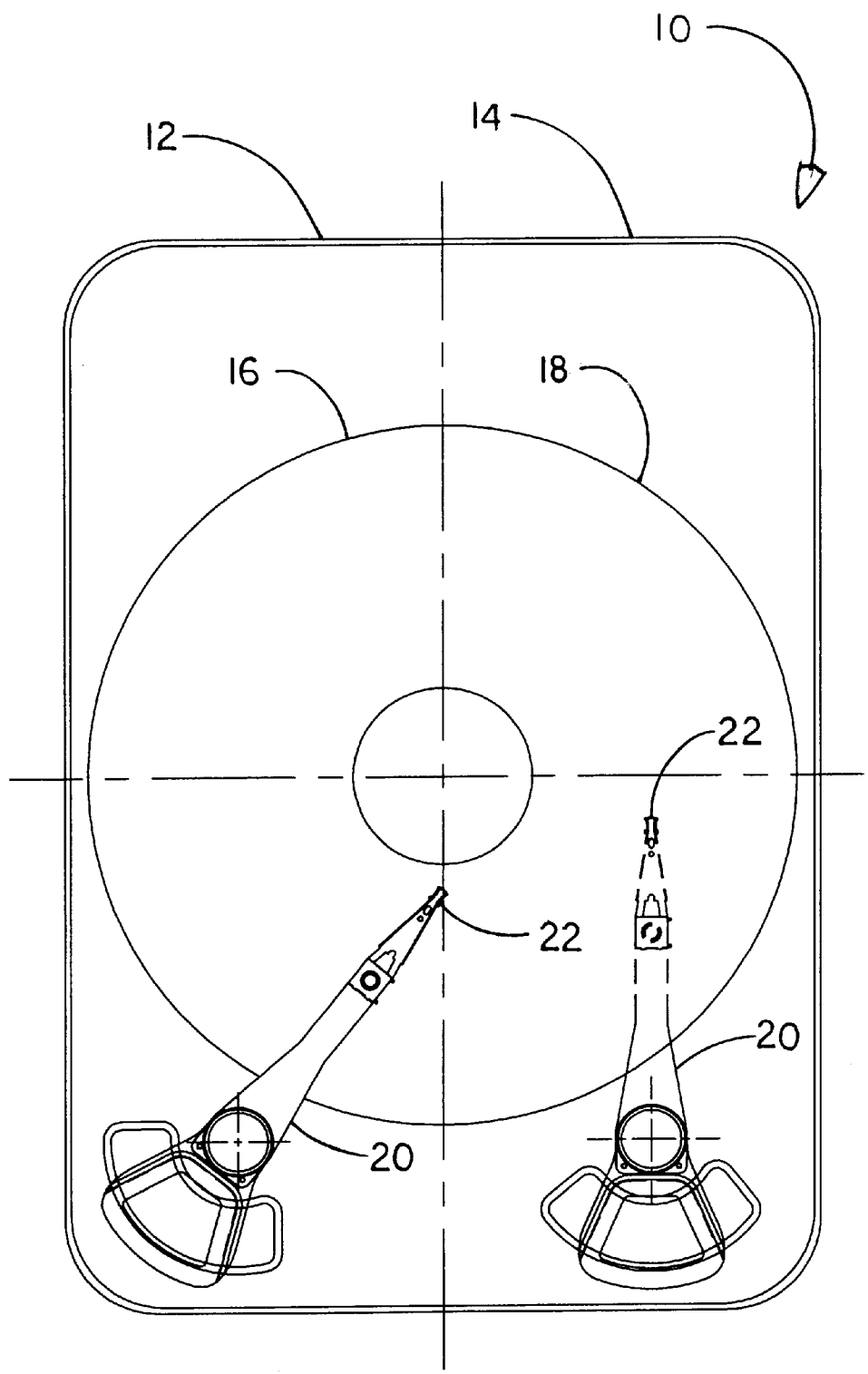
FIG. 5 is a top plan view illustrating the positioning of two actuator assemblies in a 3.5 inch disk drive form factor as constructed in accordance with the present invention.
Figure 6:
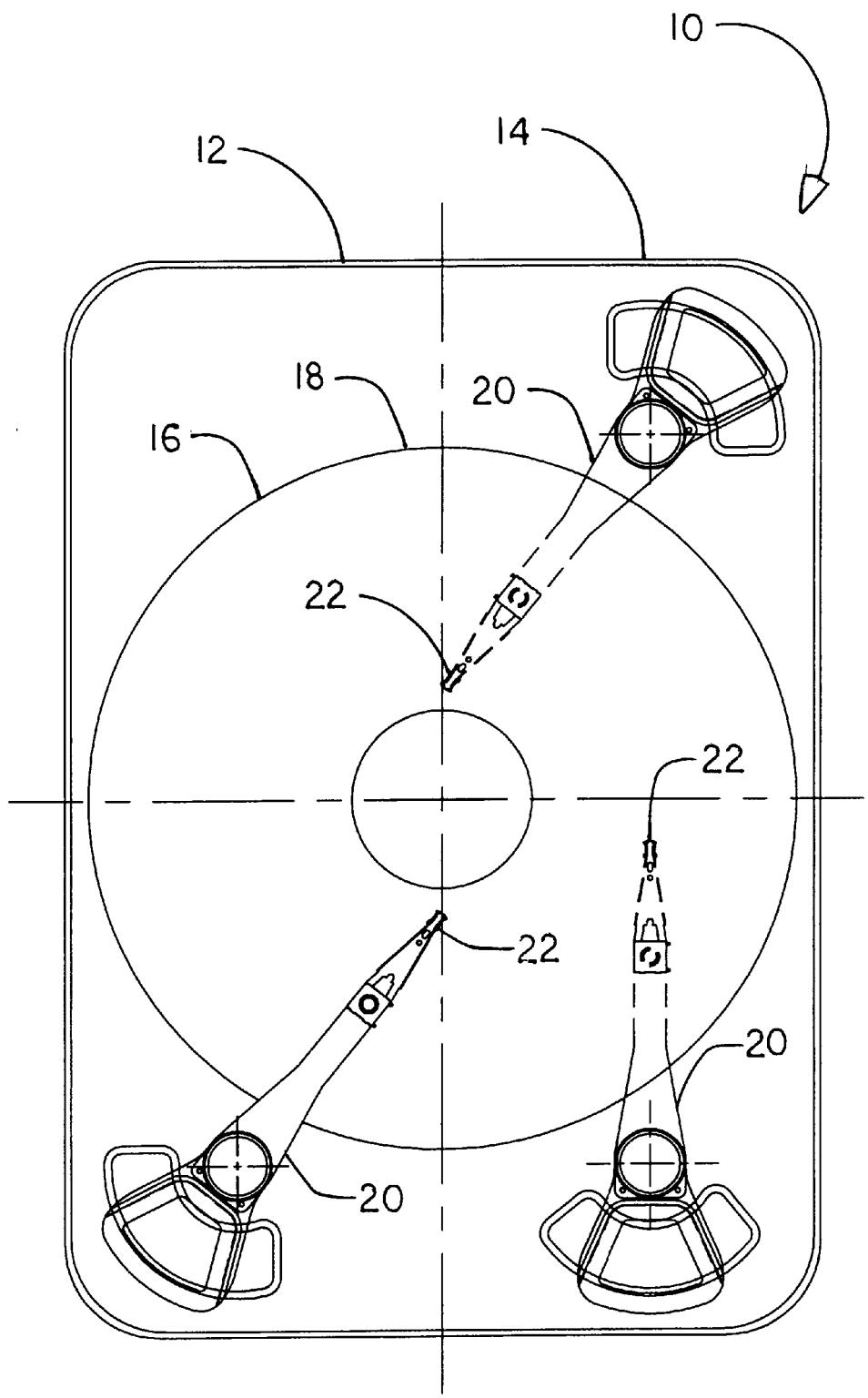
FIG. 6 is a top plan view illustrating the positioning of three actuator assemblies in a 3.5 inch disk drive form factor as constructed in accordance with the present invention.
Figure 7:
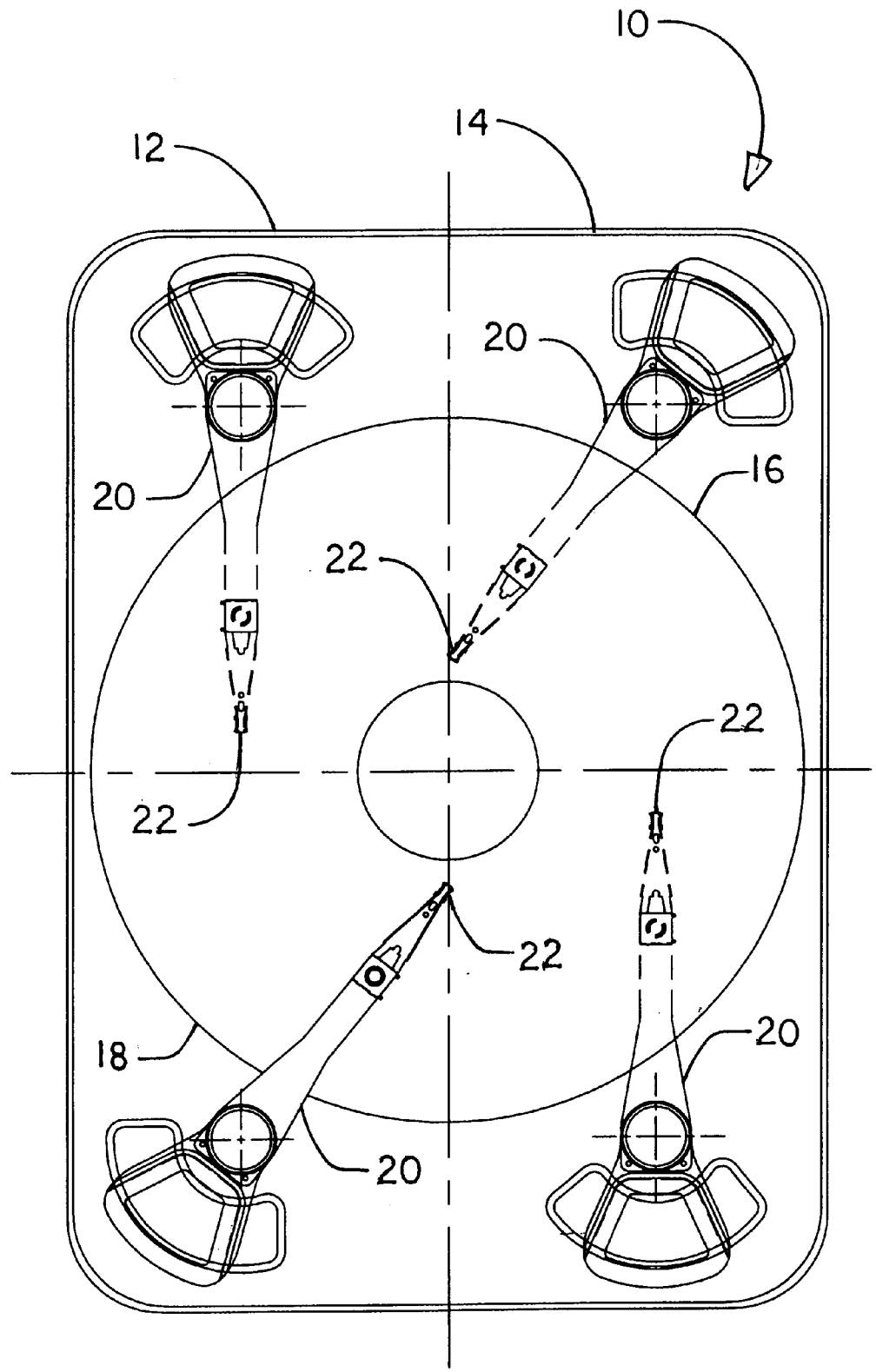
FIG. 7 is a top plan view illustrating the positioning of four actuator assemblies in a 3.5 inch disk drive form factor as constructed in accordance with the present invention.

FIGS. 5, 6, and 7 illustrate the multiple actuator assemblies 10 of the present invention within a 3.5 inch form factor utilizing 3.5 inch disks. FIG. 5 illustrates the positioning of two actuator assemblies 20. FIG. 6 illustrates the positioning of three actuator assemblies 20. FIG. 7 illustrates the positioning of four actuator assemblies 20. Assuming a general counterclockwise rotation of the disks 18, each of the actuator assemblies 20 is positioned such that the transducer head 22 is in the area to the right (as viewed from the base of each of the respective actuator arms) of the disk hub.

Figure 8:
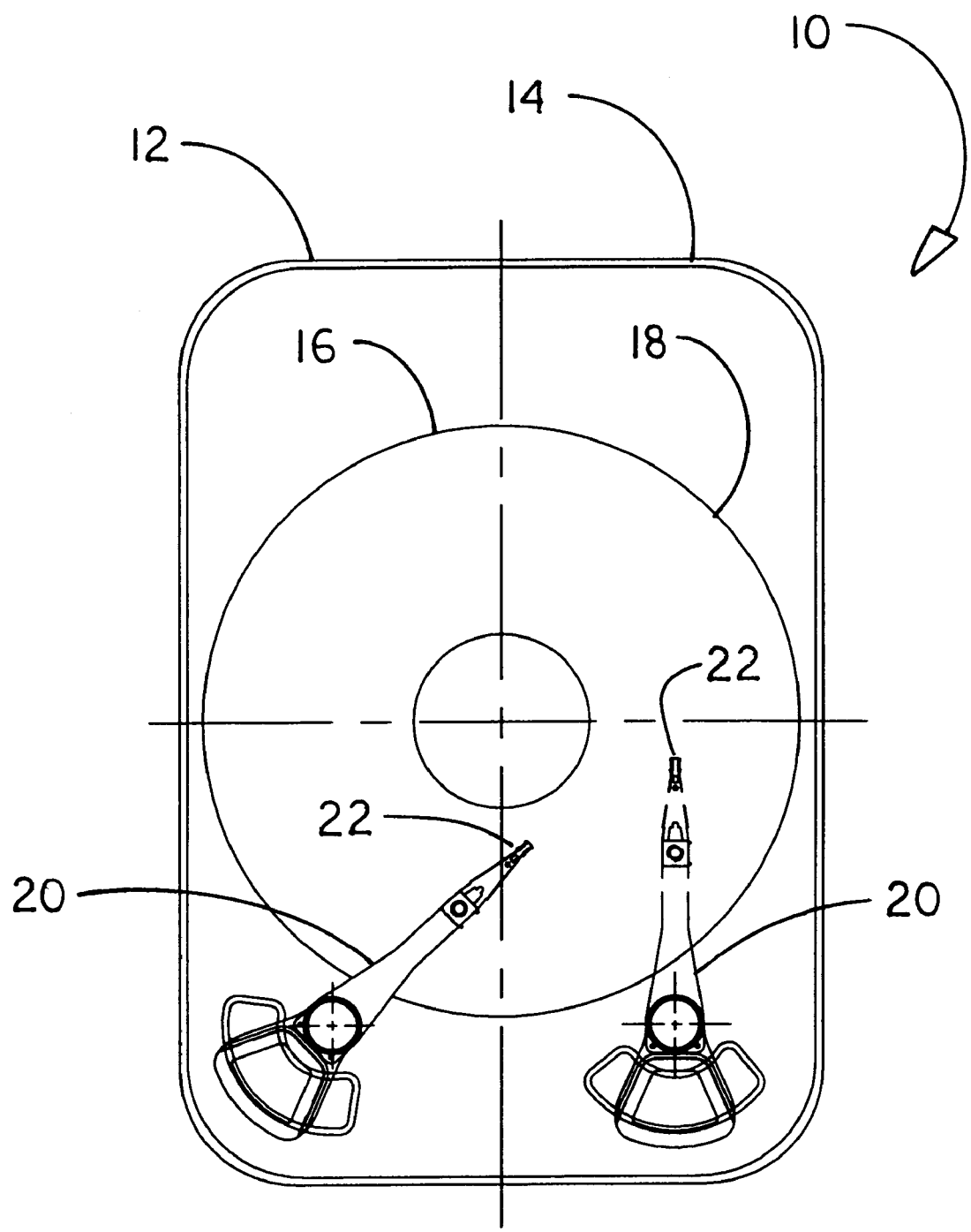
FIG. 8 is a top plan view illustrating the positioning of two actuator assemblies in a 2.5 inch disk drive form factor as constructed in accordance with the present invention.
Figure 9:
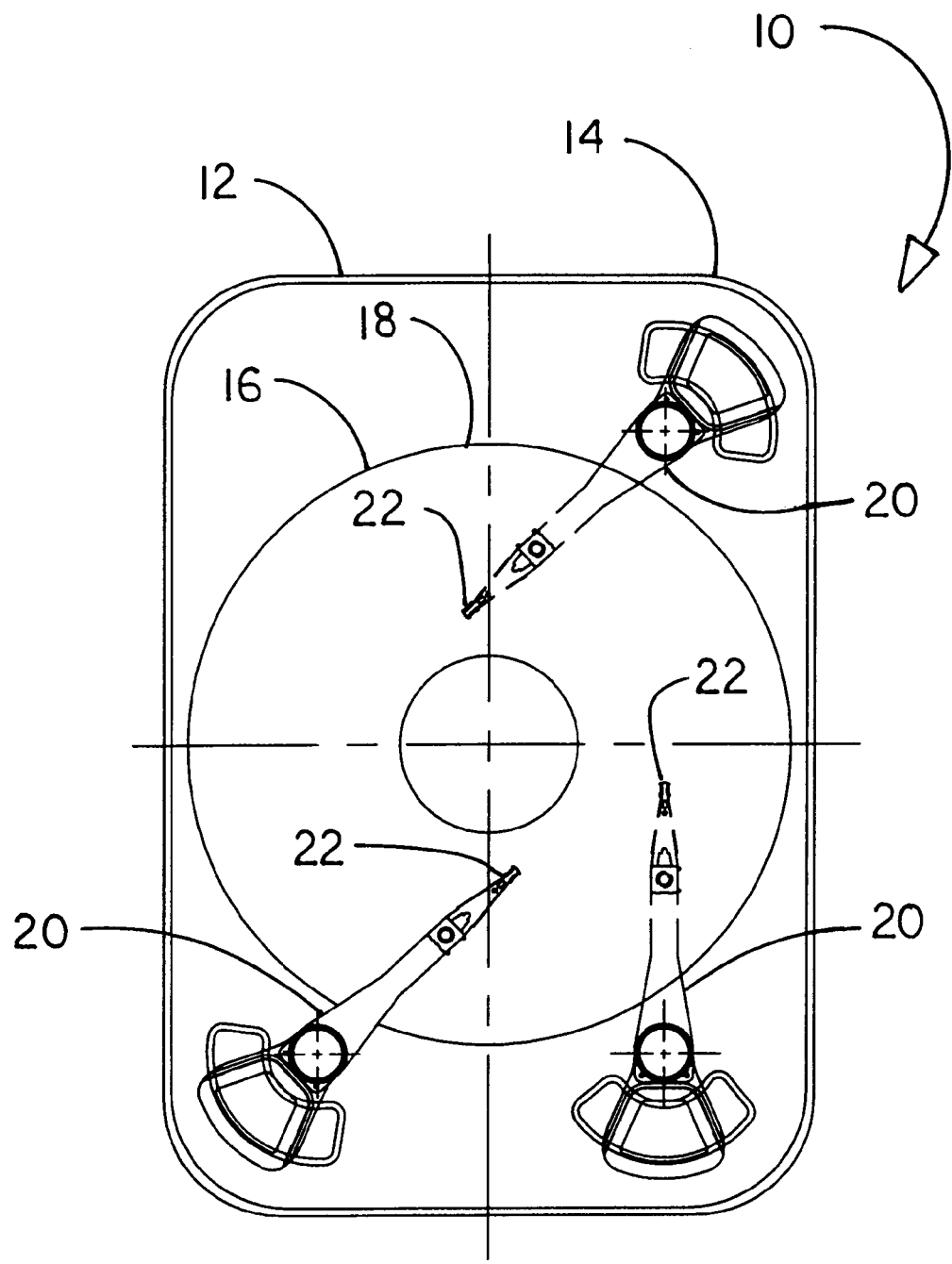
FIG. 9 is a top plan view illustrating the positioning of three actuator assemblies in a 2.5 inch disk drive form factor as constructed in accordance with the present invention.
Figure 10:
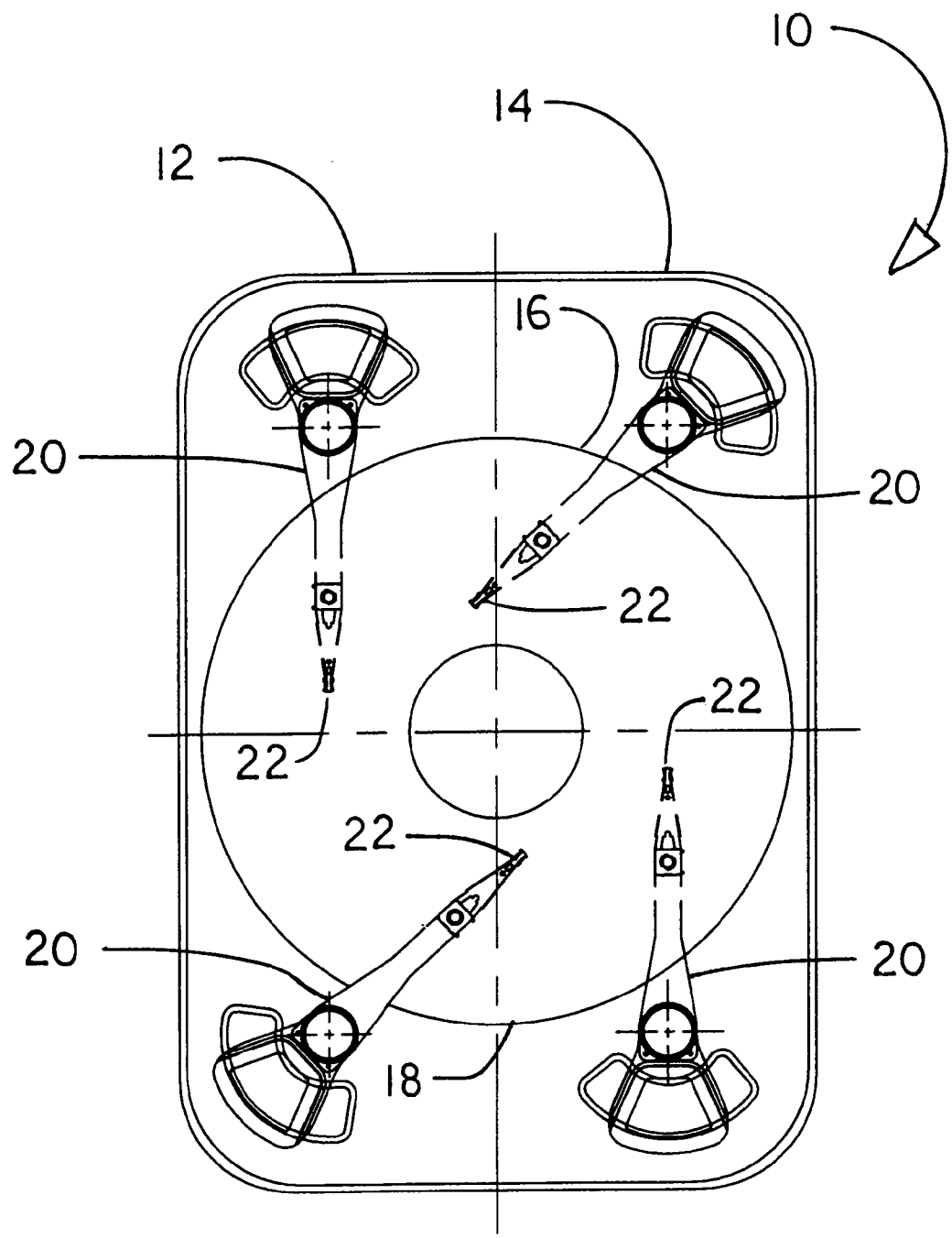
FIG. 10 is a top plan view illustrating the positioning of four actuator assemblies in a 2.5 inch disk drive form factor as constructed in accordance with the present invention.

FIGS. 8, 9, and 10 illustrate the multiple actuator assemblies 10 of the present invention within a 2.5 inch form factor utilizing 2.5 inch disks. FIG. 8 illustrates the positioning of two actuator assemblies 20. FIG. 9 illustrates the positioning of three actuator assemblies 20. FIG. 10 illustrates the positioning of four actuator assemblies 20. Assuming a general counterclockwise rotation of the disks 18, each of the actuator assemblies 20 is positioned such that the transducer head 22 is in the area to the right (as viewed from the base of each of the respective actuator arms) of the disk hub.

Figure 11:
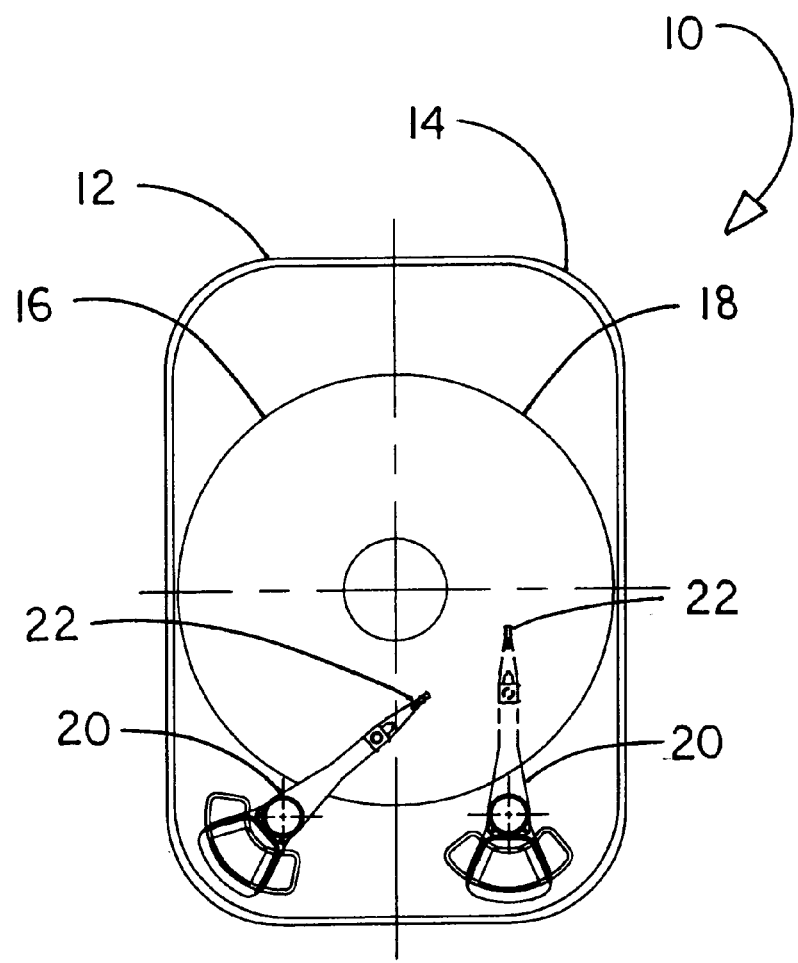
FIG. 11 is a top plan view illustrating the positioning of two actuator assemblies in a 1.8 inch disk drive form factor as constructed in accordance with the present invention.
Figure 12:
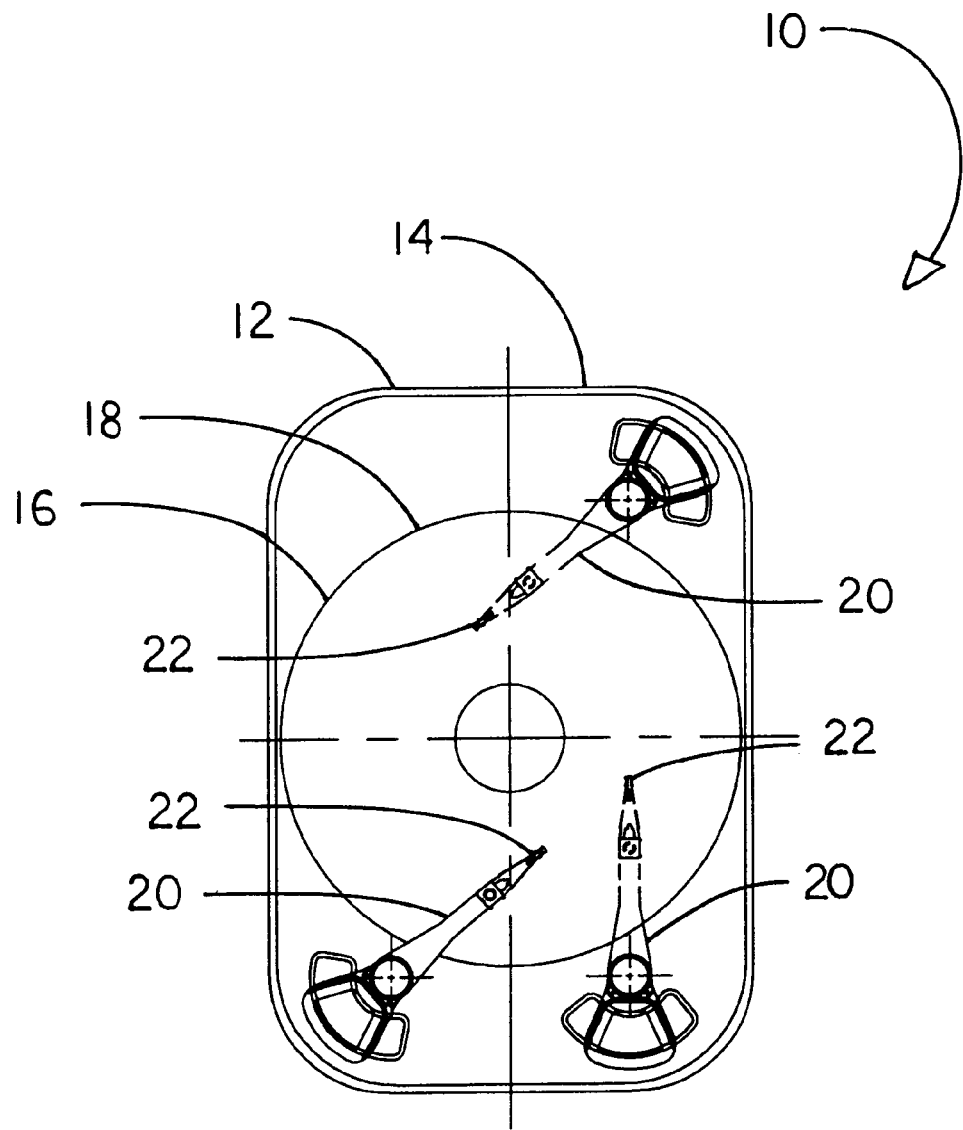
FIG. 12 is a top plan view illustrating the positioning of three actuator assemblies in a 1.8 inch disk drive form factor as constructed in accordance with the present invention.
Figure 13:
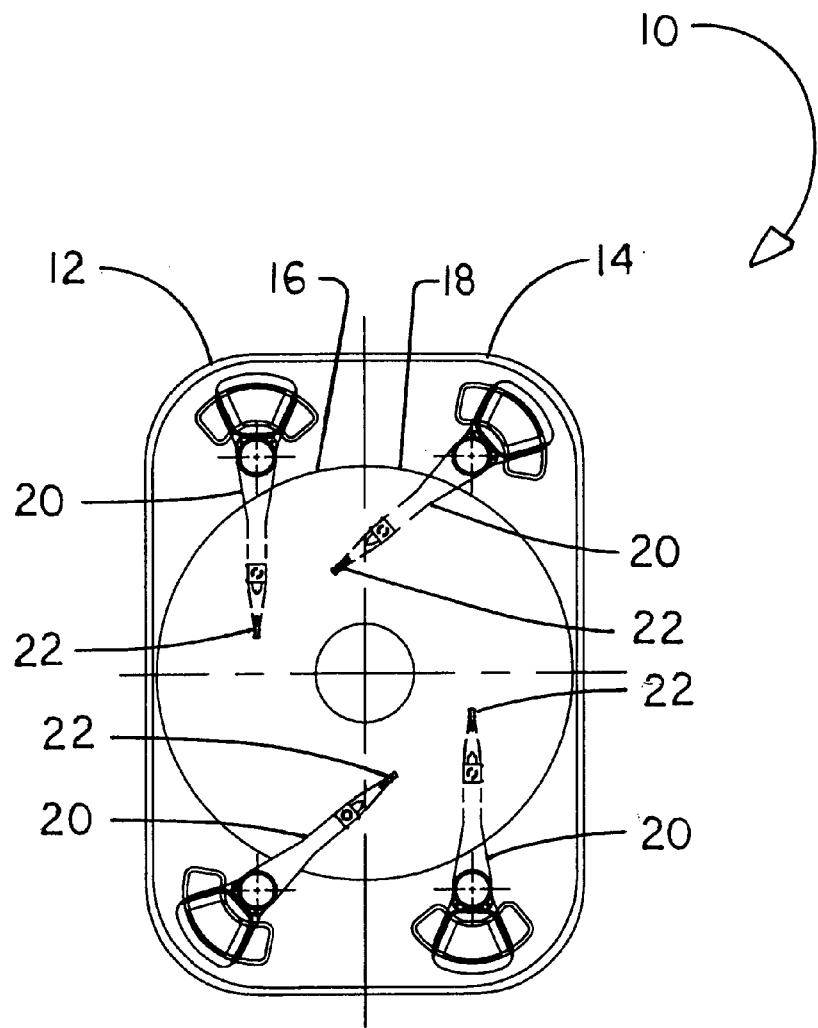
FIG. 13 is a top plan view illustrating the positioning of four actuator assemblies in a 1.8 inch disk drive form factor as constructed in accordance with the present invention.

FIGS. 11, 12, and 13 illustrate the multiple actuator assemblies 10 of the present invention within a 1.8 inch form factor utilizing 1.8 inch disks. FIG. 11 illustrates the positioning of two actuator assemblies 20. FIG. 12 illustrates the positioning of three actuator assemblies 20. FIG. 13 illustrates the positioning of four actuator assemblies 20. Assuming a general counterclockwise rotation of the disks 18, each of the actuator assemblies 20 is positioned such that the transducer head 22 is in the area to the right (as viewed from the base of each of the respective actuator arms) of the disk hub.

It should be noted that the present invention is capable of utilizing the maximum size disk 18 within each respective industry standard form factor with no limit as to the actual number of actuator assemblies 20 within the form factor. By utilizing the maximum size disk 18 within the form factor, the capacity of each rotatable storage device 12 is maximized.

Figure 14:
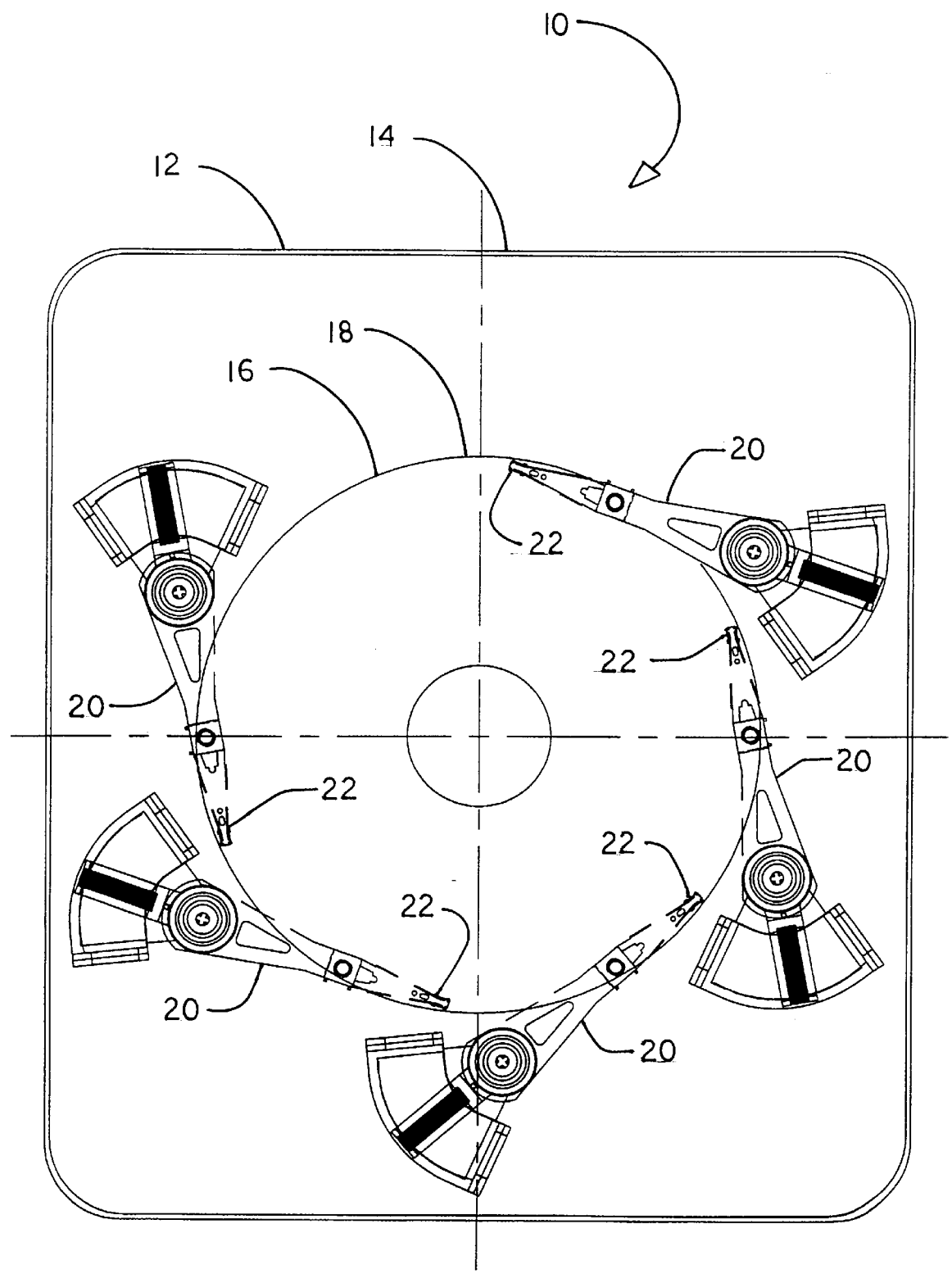
FIG. 14 is a top plan view illustrating the positioning of five actuator assemblies in a 5.2 inch disk drive form factor as constructed in accordance with the present invention.
Figure 15:
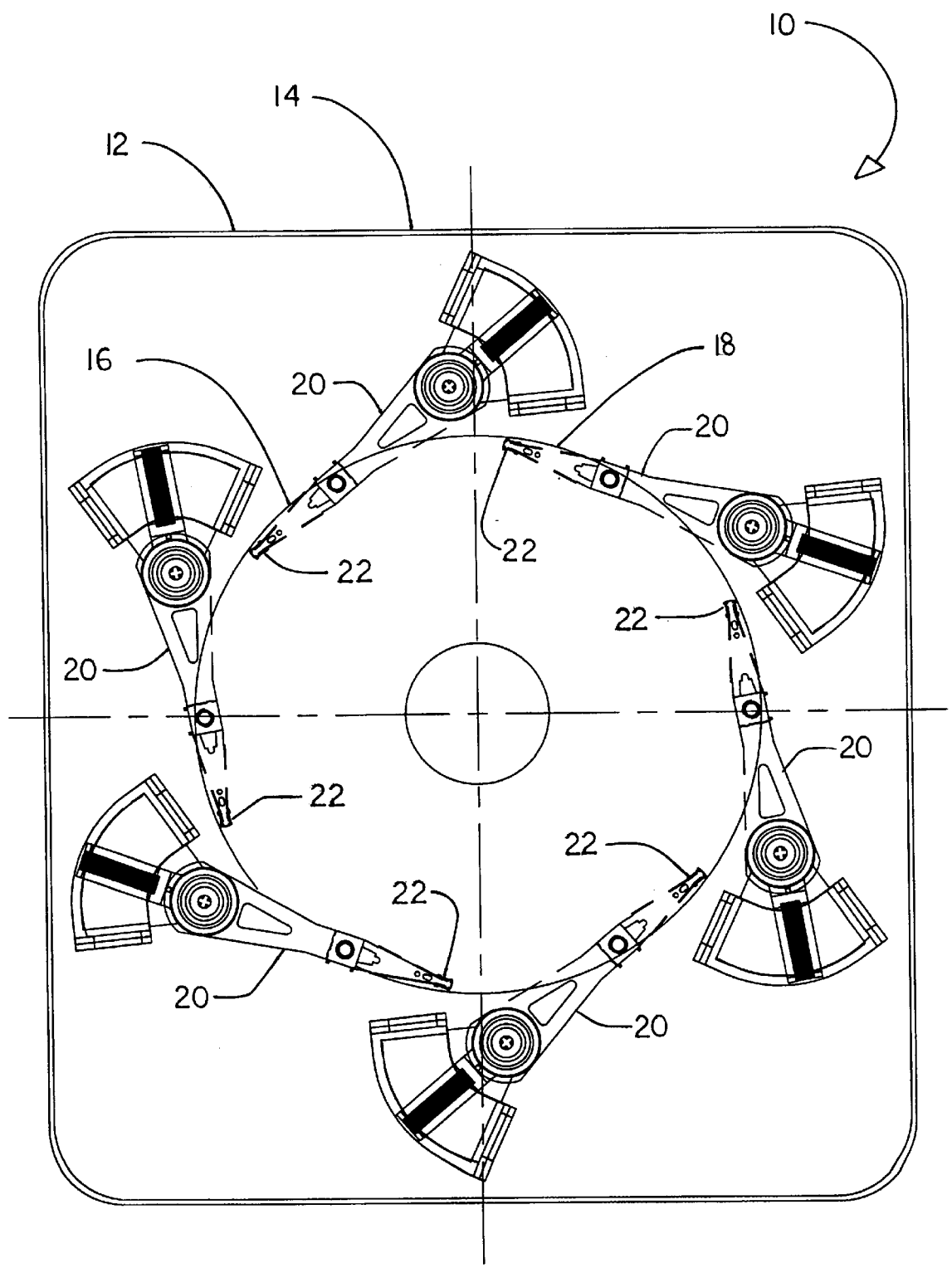
FIG. 15 is a top plan view illustrating the positioning of six actuator assemblies in a 5.2 inch disk drive form factor as constructed in accordance with the present invention.

The present invention further comprises mounting five or six actuator assemblies 20 within a form factor. FIGS. 14 and 15 illustrate the multiple actuators of the present invention within a 5.2 inch form factor utilizing 3.5 inch disks. FIG. 14 illustrates the positioning of five actuator assemblies 20. FIG. 15 illustrates the positioning of six actuator assemblies 20.

Figure 16:
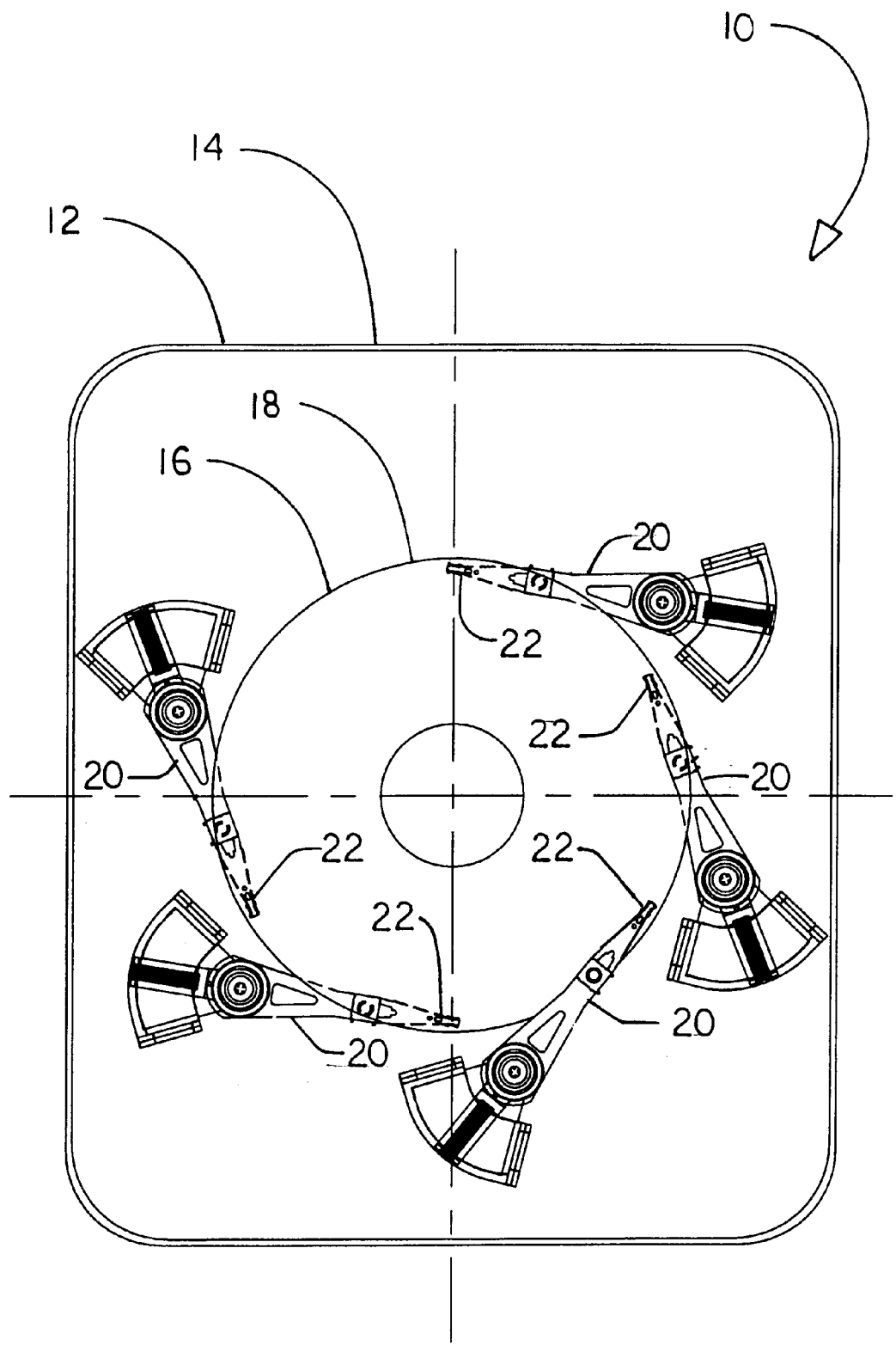
FIG. 16 is a top plan view illustrating the positioning of five actuator assemblies in a 3.5 inch disk drive form factor as constructed in accordance with the present invention.
Figure 17:
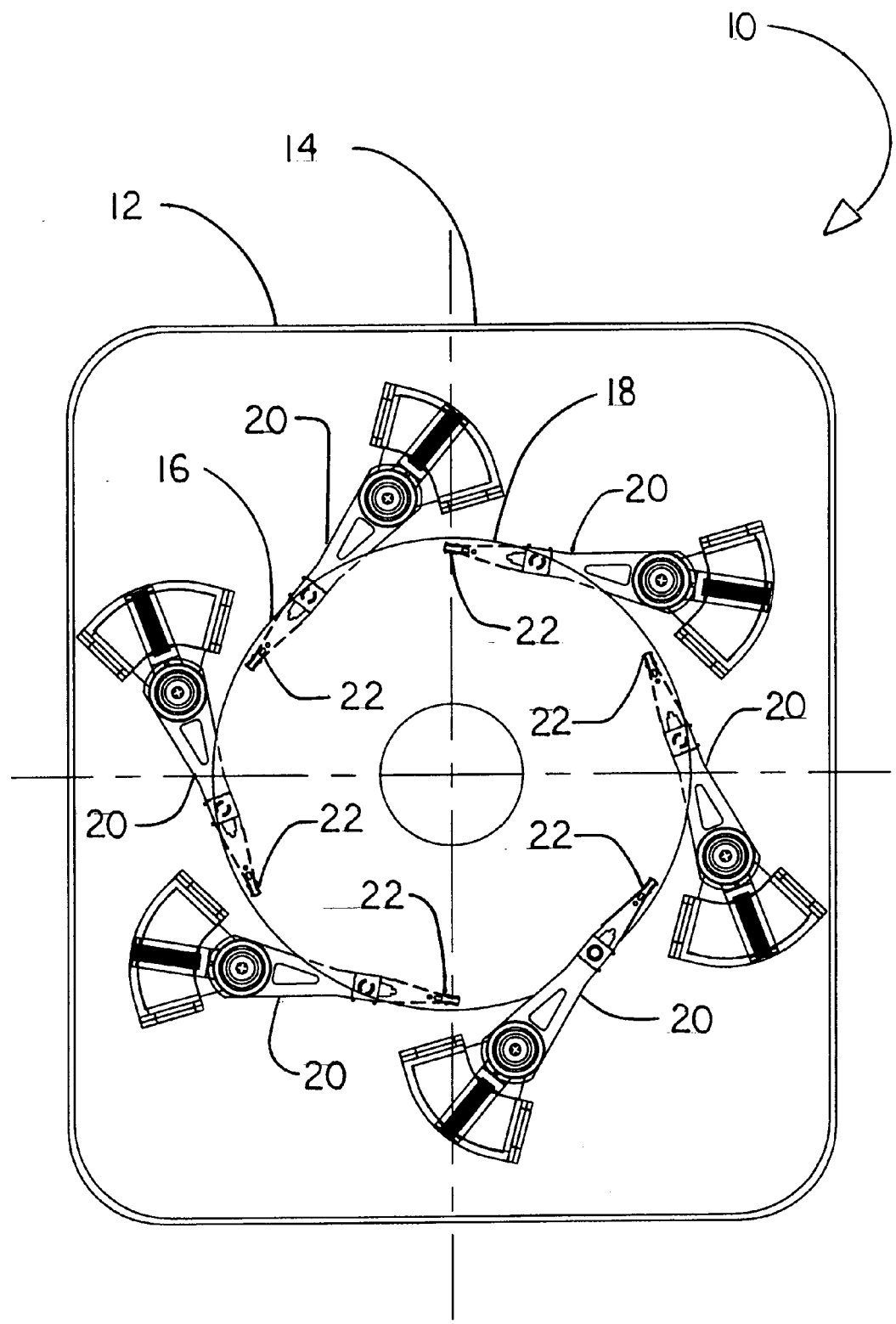
FIG. 17 is a top plan view illustrating the positioning of six actuator assemblies in a 3.5 inch disk drive form factor as constructed in accordance with the present invention.

FIGS. 16 and 17 illustrate the multiple actuators 10 of the present invention within a 3.5 inch form factor utilizing 2.5 inch disks. FIG. 16 illustrates the positioning of five actuator assemblies 20. FIG. 17 illustrates the positioning of six actuator assemblies 20.

Figure 18:
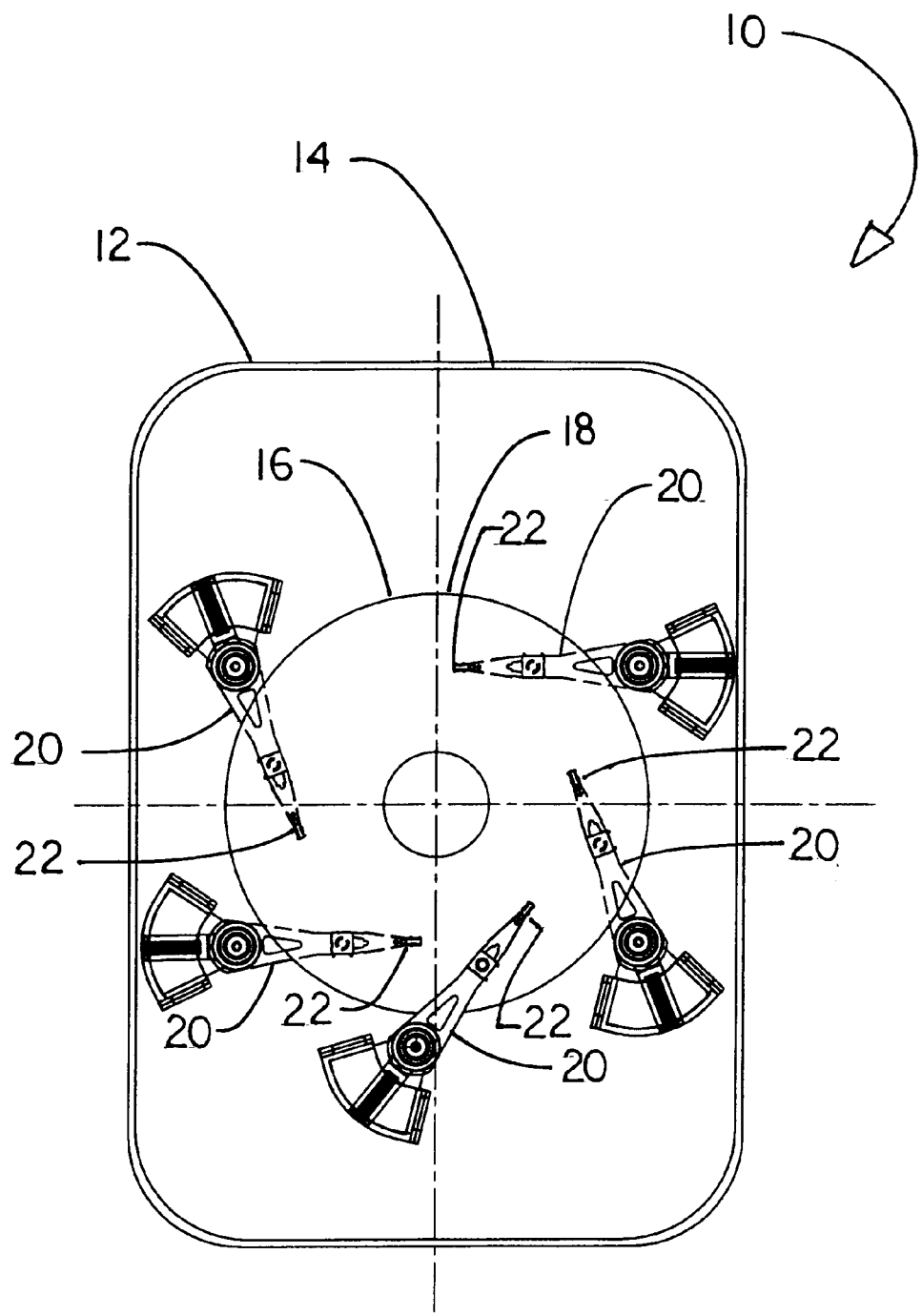
FIG. 18 is a top plan view illustrating the positioning of five actuator assemblies in a 2.5 inch disk drive form factor as constructed in accordance with the present invention.
Figure 19:
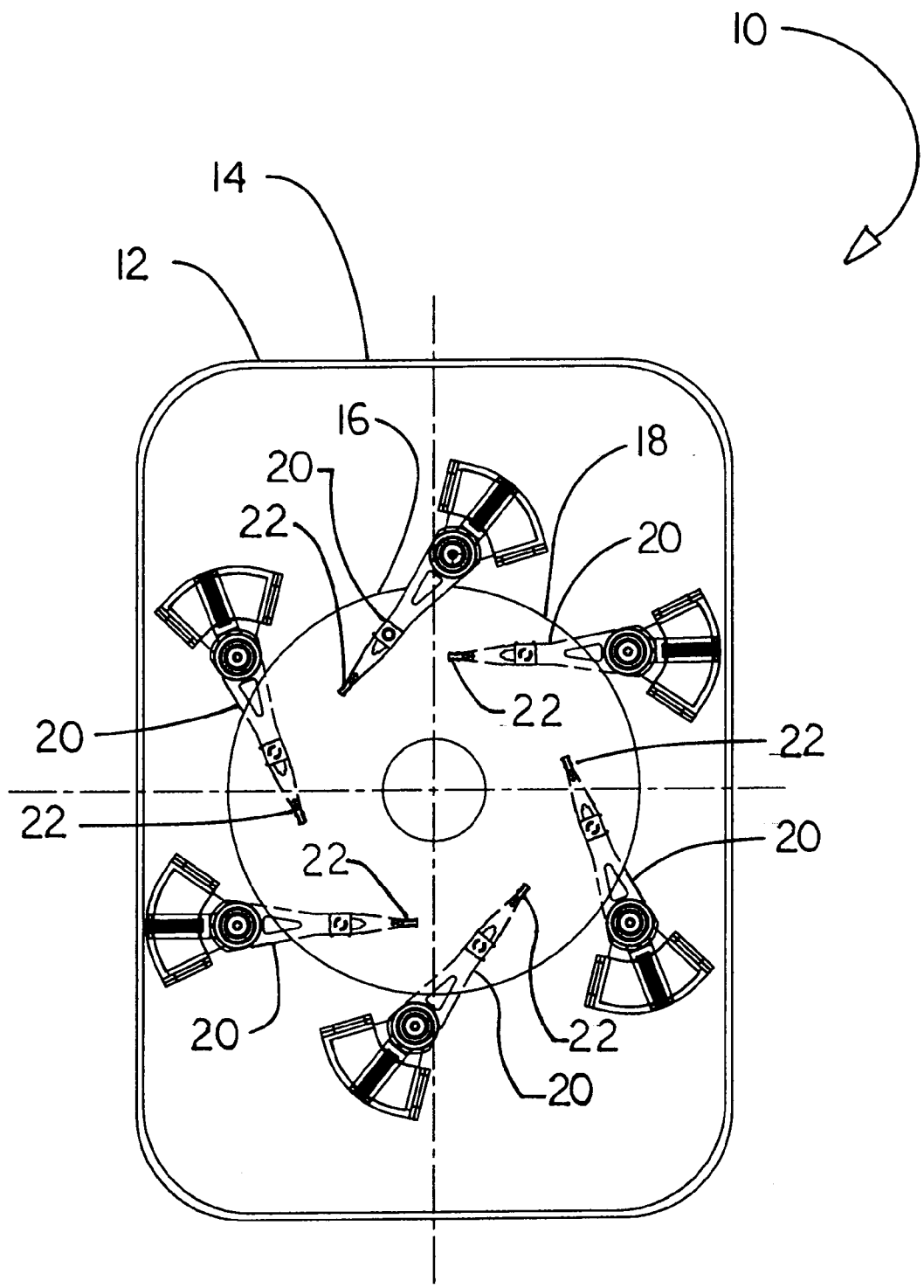
FIG. 19 is a top plan view illustrating the positioning of six actuator assemblies in a 2.5 inch disk drive form factor as constructed in accordance with the present invention.

FIGS. 18 and 19 illustrate the multiple actuators 10 of the present invention within a 2.5 inch form factor utilizing 1.8 inch disks. FIG. 18 illustrates the positioning of five actuator assemblies 20. FIG. 19 illustrates the positioning of six actuator assemblies 20.

It is within the scope of the present invention to have more than six actuator assemblies within a given form factor. Additional actuator assemblies beyond six actuator assemblies may require multiple spindles with a reduction in the disk size or actuator size, or a combination of both. Furthermore, the mechanical platform and components described herein are scaleable between the various industry standard form factors. Accordingly, it is to be understood that the dimensions given herein are illustrative only and are not limitations to the scope of the present invention.

The present invention, with at least two actuator assemblies arranged as illustrated eliminates the need during drive production for the use of a separate clock transducer head to write the servo clock track information to the disks as is conventionally done. Instead, each actuator first writes a clock track on its respective upper or lower surfaces. An externally mounted laser is then focused through apertures on the actuator assembly having transducer heads adjacent to the lower surfaces to accurately control the angular position of the actuator.

This actuator is used to write the servo tracks on the lower surfaces while the other actuator assembly reads the previously recorded clock track on the upper surfaces, providing the necessary reference during the servo track writing operation. The process is then reversed for writing the servo tracks on the upper surfaces. Thus, a separate clock transducer head is not required as is typically necessary in conventional disk drive construction.

Another advantage of the present invention with the use of two or more actuators, as illustrated, is that the spacing between disks is reduced to a minimum because the transducer heads carried by each actuator are all oriented either up or down and thus clearance for only one actuator arm and its transducer head is required between disks. It is to be understood, that the structure of the transducer head disk assembly in accordance with the present invention may include only one actuator assembly, necessarily with double transducer heads on each inner actuator arm. However, at least two actuator assemblies are preferred, and three, four, five, six, or more can also be utilized.

Each of the actuator assemblies in accordance with the present invention includes a rotatable stack of actuator arms each supporting a read/write transducer head on the free distal end of a flexure. Each actuator arm or actuator assembly, including a flexure and a transducer head, is preferably identical and interchangeable. Each of the actuator arms is rotatably mounted to an actuator spindle shaft fastened to the baseplate via a concentric bearing supported tubular sleeve.

Figure 20:
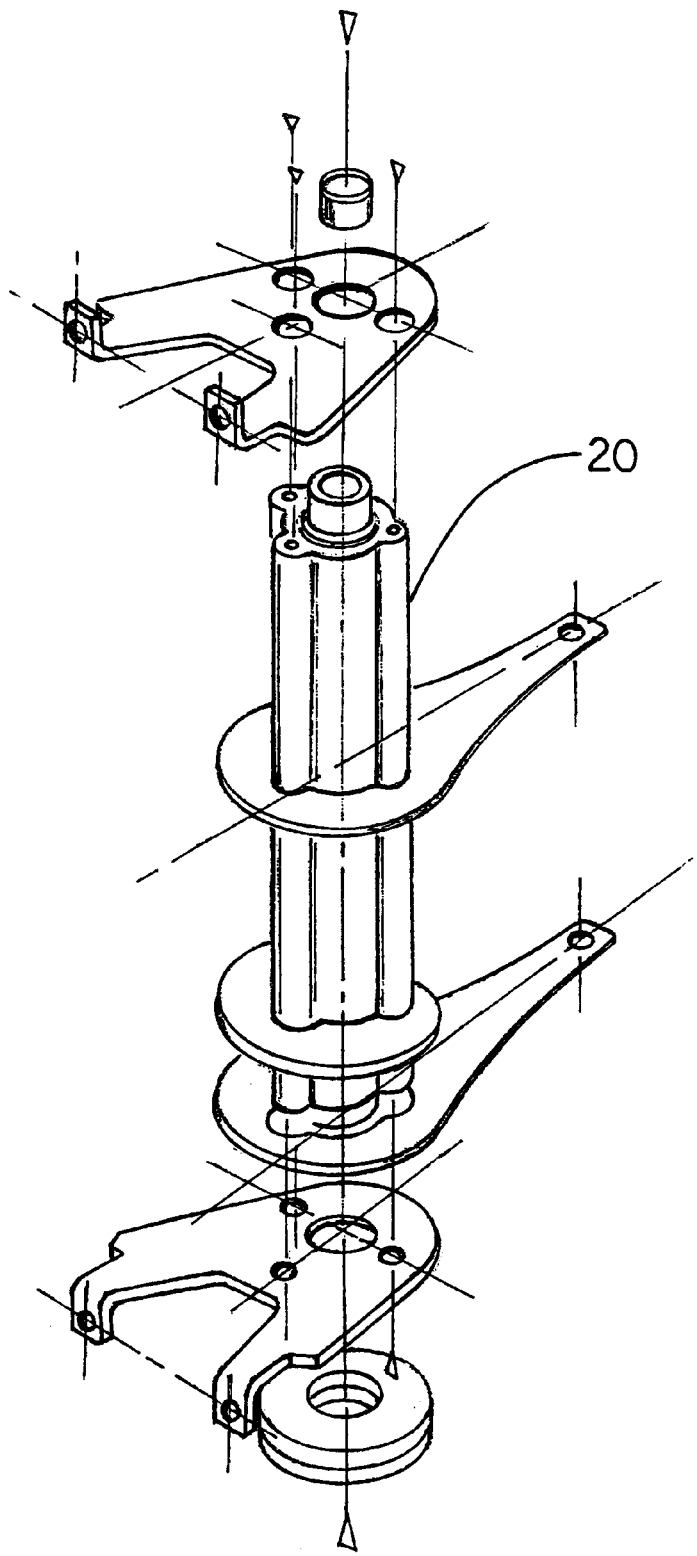
FIGS. 20, 21, and 22, are views of an improved actuator spindle housing for mounting the actuator arms thereon as constructed in accordance with the present invention.
Figure 21:
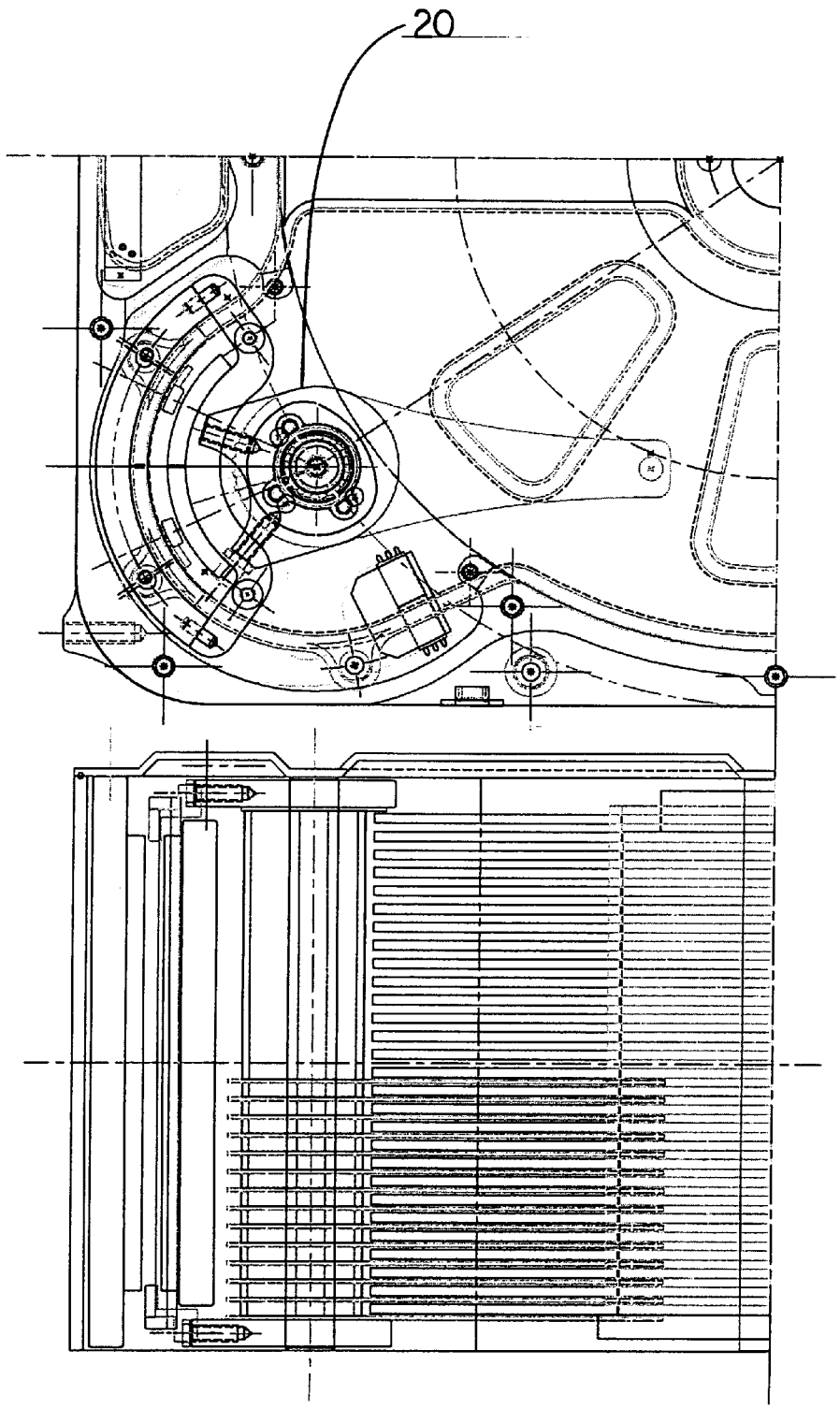
Figure 22:
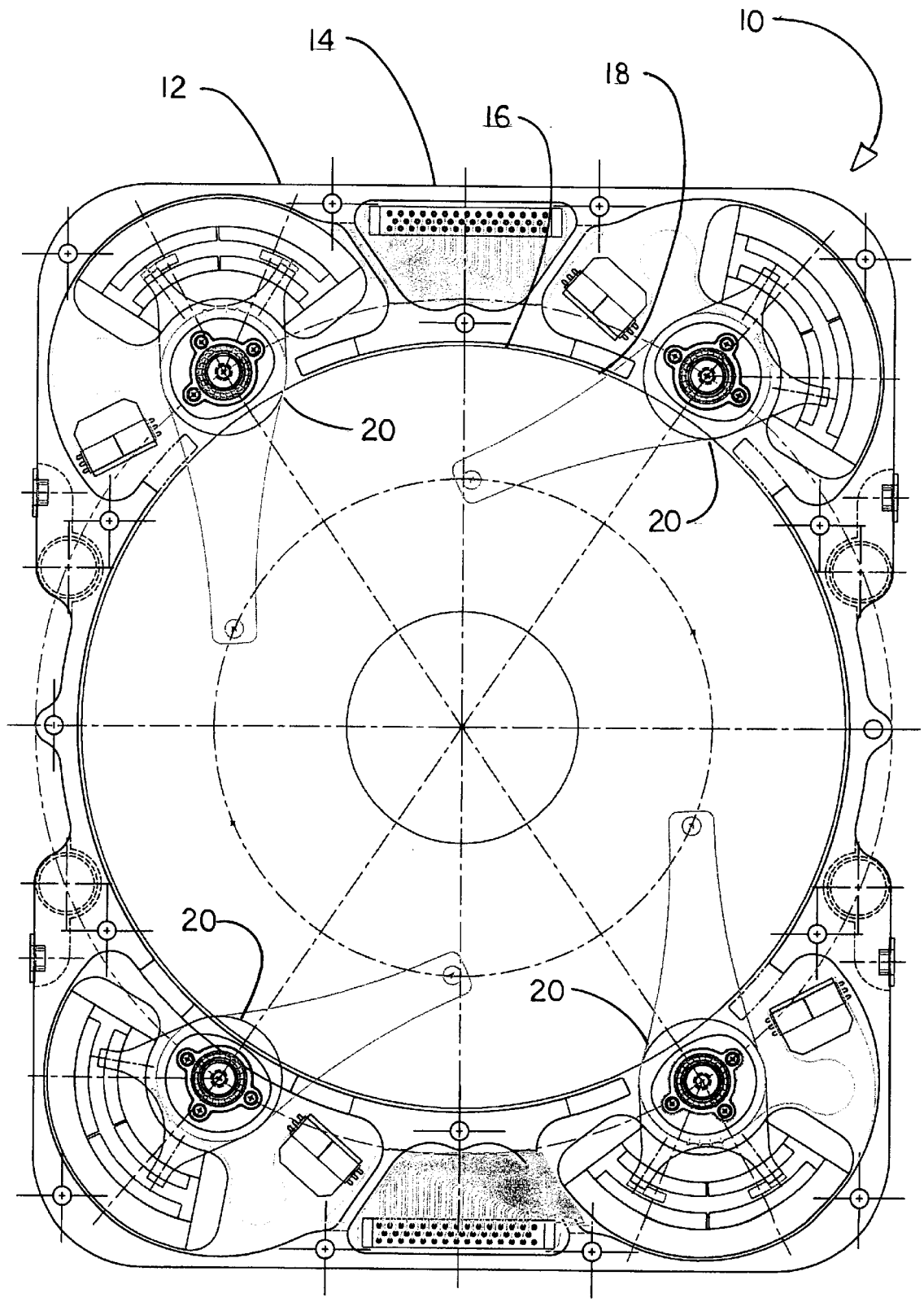

As illustrated in FIGS. 20, 21, and 22, the present invention further comprises an improved actuator spindle housing for mounting the actuator arms thereon. The actuator spindle housing of the present invention is preferably comprised of a material stiffer than aluminum such as an extruded plastic, ceramic composite, or metal material, however, other materials are within the scope of the present invention.

The actuator spindle housing comprises a base having a plurality of pockets formed on the base. The pockets of the actuator spindle housing correspond to indentations formed in the actuator arms for maintaining the relative positioning of the actuator arm about the actuator spindle housing. A plurality of actuator arms are mountable about each actuator spindle housing separated by spacers as desired by the user. The improved actuator spindle housing of the present invention provides an actuator spindle housing which is easier to manufacture such that assembly of the actuator assembly requires fewer parts and is much more efficient than the prior art actuator assemblies.

Figure 23:
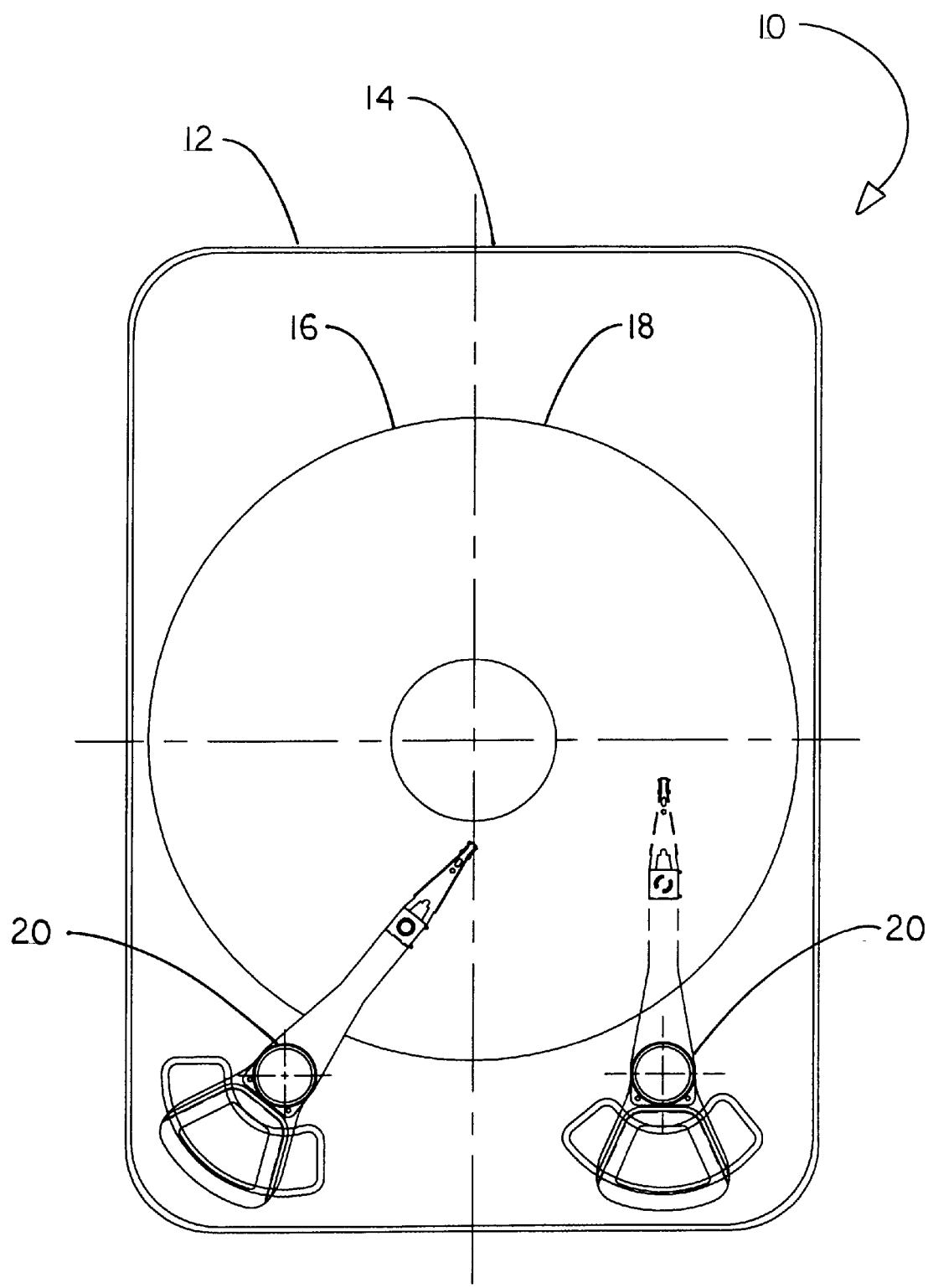
FIG. 23 is a top plan view illustrating an embodiment of the present invention having the multiple actuators within an industry standard 5.2 inch form factor with the spindle of the disks being off-centered as constructed in accordance with the present invention.

FIG. 23 illustrates an embodiment of the present invention having the multiple actuators within an industry standard 5.2 inch form factor with the spindle of the disks being off-centered.

Figure 24:
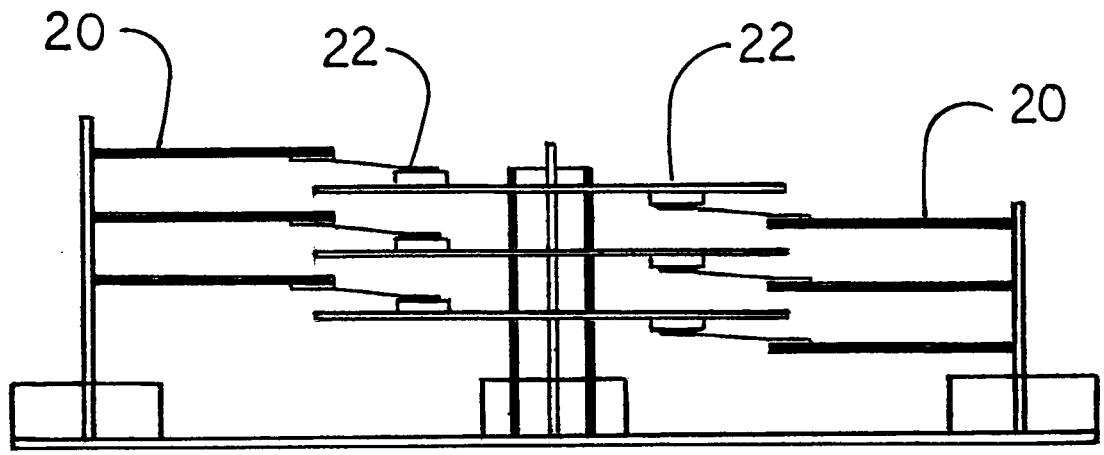
FIG. 24 is a side view illustrating the read/writes on the actuators being either "transducer heads up" or "transducer heads down" on each actuator arm as constructed in accordance with the present invention.
Figure 24:
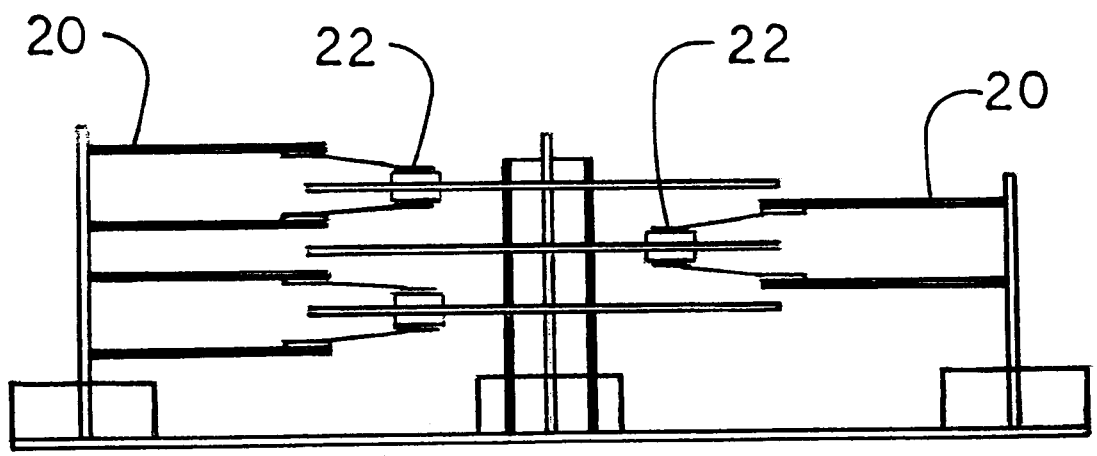

FIG. 24 illustrates a side view of the multiple actuators of the present invention showing the read/writes on the actuators being either "transducer heads up" or "transducer heads down" on each actuator arm. By positioning the read/writes with either "transducer heads up" or "transducer heads down", substantially greater capacity is possible since the disks can be positioned closer to each other and more disks can be placed in any give 'z' height. It is further within the scope of the present invention to have both "transducer heads up" and "transducer heads down" on each actuator arm as is standard in the industry today.

FIG. 24 also illustrates a data storage device having a first data storage disk and a first actuator arm assembly having at least one arm, each of the arms have a distal end carrying a read/write transducer head for reading information from and writing information to only the first data storage disk. Furthermore, a second data storage disk with a second actuator arm assembly having at least one arm is provided. Each arm has a distal end carrying a read/write transducer head with the read/write transducer head reading information from and writing information to only the second data storage disk. A third, fourth, fifth, sixth, and up to twelve data storage disks can be provided in the same fashion with each having its own actuator arm assembly having at least one arm, each arm having a distal end carrying a read/write transducer head. The read/write transducer head of each actuator arm assembly reads information from and writes information to its respective disk.

Figure 25:
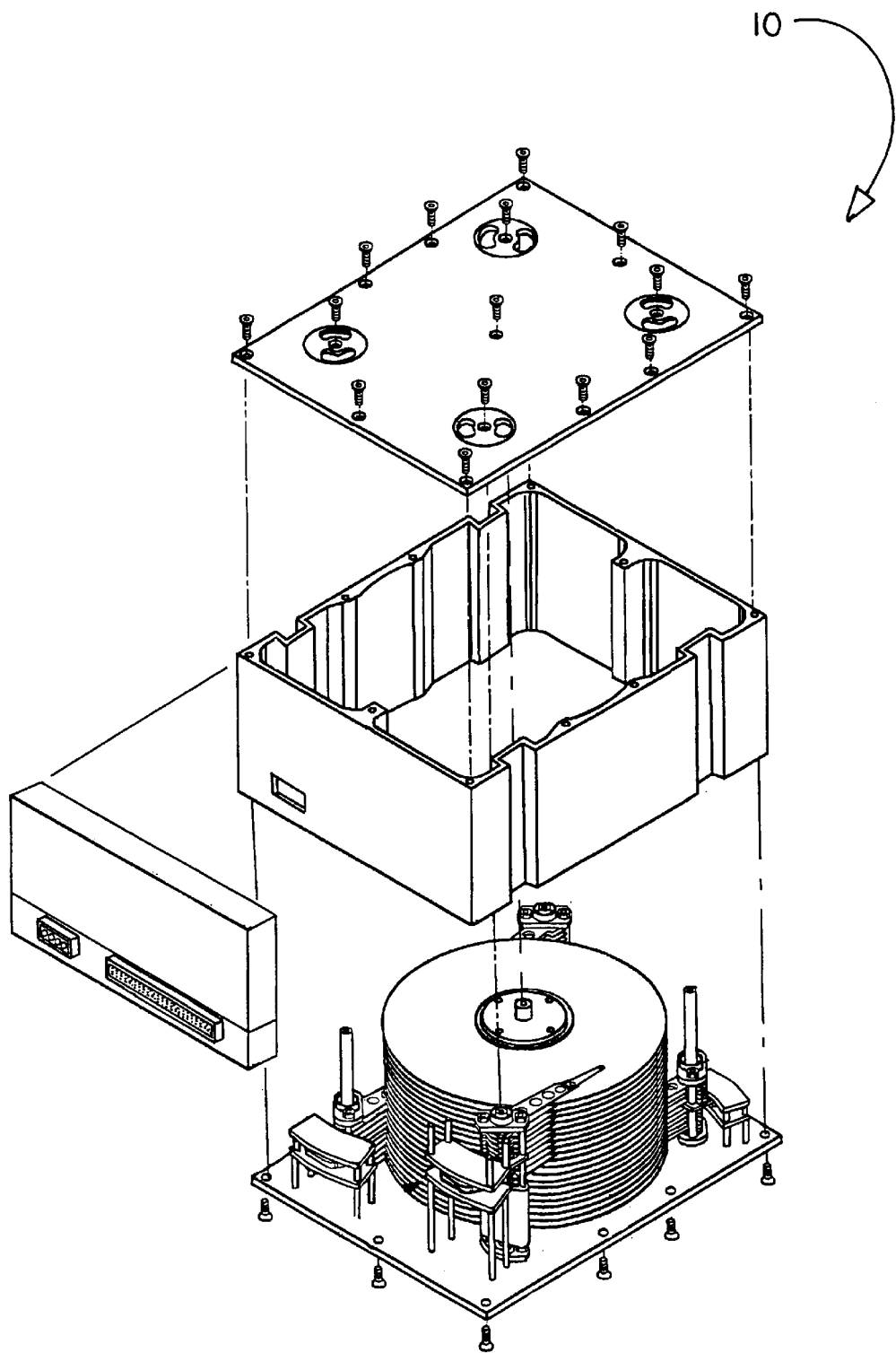
FIG. 25 is a perspective view illustrating an embodiment of the present invention of the disk drive wherein the top plate, the bottom plate, the extrusion, the disk spindle shaft, and the actuator spindle shafts comprise ceramic or ceramic composites.
Figure 26:
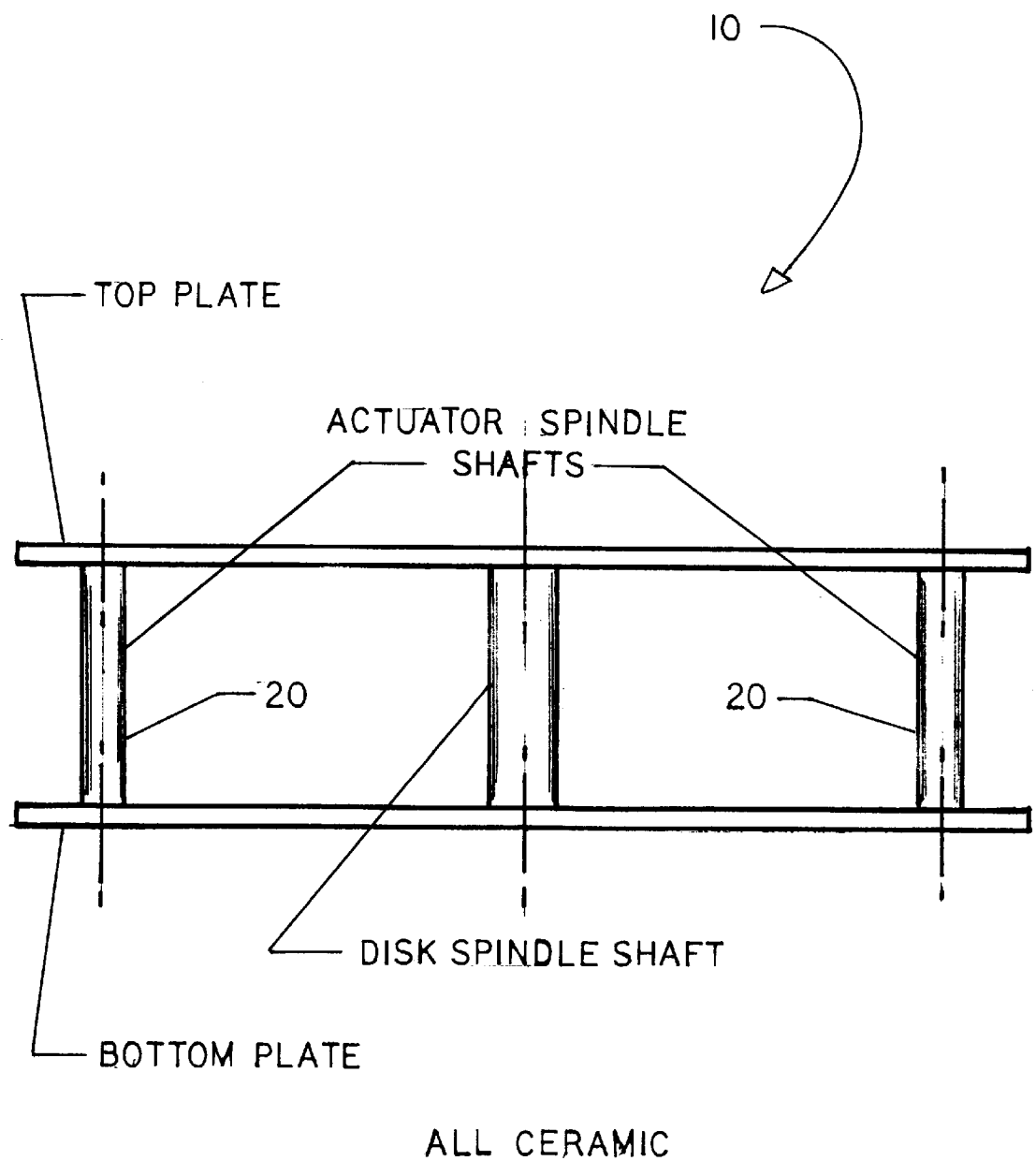
FIG. 26 is a side view illustrating an embodiment of the present invention of the disk drive wherein the top plate, the bottom plate, the extrusion, the disk spindle shaft, and the actuator spindle shafts comprise ceramic or ceramic composites.

Typically, the components of a present disk drive are comprised of metal, i.e., steel and/or aluminum. FIGS. 25 and 26 illustrate an embodiment of the present invention of the disk drive wherein the top plate, the bottom plate, the extrusion, the disk spindle shaft, and the actuator spindle shafts comprise ceramic, ceramic composites, and/or magnetically permeable material. Having the components of the disk drive being comprised of ceramic or ceramic composites, the components of the disk drive have a higher thermal conductivity than aluminum. Furthermore, the resonant vibrations inherent in the disk drive are substantially reduced, if not in fact eliminated.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

I claim:

1. A data storage device having a first data storage disk rotating either clockwise or counterclockwise and a first actuator arm assembly having at least one arm, each of the arms have a distal end carrying a read/write transducer head for reading information from and writing information to only the first data storage disk, the device comprising:
   a second data storage disk rotating in the same general direction as the first data storage disk; and
   a second actuator arm assembly having at least one arm, each arm having a distal end carrying a read/write transducer head, the read/write transducer head reading information from and writing information to only the second data storage disk;
   wherein the first data storage disk is free from having information read from and written to by the second actuator arm assembly and wherein the second data storage disk is free from having information read from and written to by the first actuator arm assembly.

2. The data storage device of claim 1 and further comprising a third data storage disk rotating in the same general direction as the first data storage disk and a third actuator arm assembly having at least one arm, each arm having a distal end carrying a read/write transducer head, the read/write transducer head reading information from and writing information to only the third data storage disk wherein the third data storage disk is free from having information read from and written to by the first and second actuator arm assemblies.

3. The data storage device of claim 2 and further comprising a fourth data storage disk rotating in the same general direction as the first data storage disk and a fourth actuator arm assembly having at least one arm, each arm having a distal end carrying a read/write transducer head, the read/write transducer head reading information from and writing information to only the fourth data storage disk wherein the third data storage disk is free from having information read from and written to by the first, second, and third actuator arm assemblies.

4. The data storage device of claim 3 and further comprising a fifth data storage disk rotating in the same general direction as the first data storage disk and a fifth actuator arm assembly having at least one arm, each arm having a distal end carrying a read/write transducer head, the read/write transducer head reading information from and writing information to only the fifth data storage disk wherein the fourth data storage disk is free from having information read from and written to by the first, second, third, and fourth actuator arm assemblies.

5. The data storage device of claim 4 and further comprising a sixth data storage disk rotating in the same general direction as the first data storage disk and a sixth actuator arm assembly having at least one arm, each arm having a distal end carrying a read/write transducer head, the read/write transducer head reading information from and writing information to only the sixth data storage disk wherein the fifth data storage disk is free from having information read from and written to by the first, second, third, fourth, and fifth actuator arm assemblies.

6. The data storage device of claim 5 and further comprising 'n' data storage disks rotating in the same general direction as the first data storage disk and 'n' actuator arm assemblies having at least one arm each, each arm having a distal end carrying a read/write transducer head, the read/write transducer head of each actuator arm assembly reading information from and writing information to a respective one of the data storage disks wherein the 'n' data storage disk is free from having information read from and written to by the first, second, third, fourth, fifth, and sixth actuator arm assemblies.

7. The data storage device of claim 1 wherein each data storage disk has a first side and a second side, the read/write transducer heads on the first actuator assembly being heads up and the read/write transducer heads on the second actuator assembly being heads down.

8. The data storage device of claim 1 and further comprising a housing surrounding the data storage disks and the actuator assemblies, the housing comprising a top plate, a bottom plate, a middle connecting portion, the disk spindle shaft, and the actuator spindle shafts constructed from a material stiffer than aluminum.

9. The data storage device of claim 1 wherein the spacing between the disks is minimized.

10. The data storage device of claim 1 wherein each read/write transducer head is constructed substantially identical and interchangeable with each other read/write transducer head.

11. A data storage device having at least one disk rotating about a spindle, the device comprising:

at least two actuator arm assemblies, a first actuator arm assembly and a second actuator arm assembly, each actuator arm assembly having at least one read/write transducer head, each read/write transducer head on the first actuator arm assembly being constructed substantially identical to and following the disk in the same direction as each read/write transducer head on the second actuator arm assembly, wherein the first actuator arm assembly and the second actuator arm assembly are positioned on the same side of the spindle.

12. The data storage device of claim 11 and further comprising a third actuator arm assembly, the third actuator arm assembly having at least one read/write transducer head, each read/write head being constructed substantially identical to each read/write transducer head of the first and second actuator arm assemblies to follow the disk in the same direction.

13. The data storage device of claim 11 and further comprising a fourth actuator arm assembly, the fourth actuator arm assembly having at least one read/write transducer head, each read/write head being constructed substantially identical to each read/write transducer head of the first, second, and third actuator arm assemblies to follow the disk in the same direction.

14. The data storage device of claim 11 and further comprising a fifth actuator arm assembly, the fifth actuator arm assembly having at least one read/write transducer head, each read/write head being constructed substantially identical to each read/write transducer head of the first, second, third, and fourth actuator arm assemblies to follow the disk in the same direction.

15. The data storage device of claim 11 and further comprising a sixth actuator arm assembly, the sixth actuator arm assembly having at least one read/write transducer head, each read/write head being constructed substantially identical to each read/write transducer head of the first, second, third, fourth, and fifth actuator arm assemblies to follow the disk in the same direction.

16. The data storage device of claim 11 and further comprising an 'nth' actuator arm assembly the 'nth' actuator arm assembly having at least one read/write transducer head, each read/write head being constructed substantially identical to each other read/write transducer head to follow the disk in the same direction.

17. The data storage device of claim 11 wherein the data storage device requires no servo clock head to write servo clock track information to the disks.

18. The data storage device of claim 17 wherein the first actuator assembly has a first read/write transducer head and a second read/write transducer head and the second actuator assembly has a first read/write transducer head and a second read/write transducer head, the first or second read/write transducer head of the first actuator assembly writing clock track on the first data storage disk while the first or second read/write transducer head of the second actuator assembly writing servo information on the second data storage disk.

19. The data storage device of claim 17 wherein the first actuator assembly has a first read/write transducer head and a second read/write transducer head and the second actuator assembly has a first read/write transducer head and a second read/write transducer head, the first or second read/write transducer head of the second actuator assembly writing clock track on the first data storage disk while the first or second read/write transducer head of the first actuator assembly writing servo information on the second data storage disk.

20. The data storage device of claim 11 wherein each read/write transducer head on the first actuator arm assembly is positioned on a first side of the disk and each read/write transducer head on the second actuator arm assembly is positioned on a second side of the disk.

* * * * *